(12) United States Patent
Yee

(10) Patent No.: US 8,620,113 B2
(45) Date of Patent: Dec. 31, 2013

(54) LASER DIODE MODES

(75) Inventor: Dawson Yee, Medina, WA (US)

(73) Assignee: Microsoft Corporation, Redmond, WA (US)

( * ) Notice: Subject to any disclaimer, the term of this patent is extended or adjusted under 35 U.S.C. 154(b) by 217 days.

(21) Appl. No.: 13/093,621

(22) Filed: Apr. 25, 2011

(65) Prior Publication Data

US 2012/0268362 A1 Oct. 25, 2012

(51) Int. Cl.
*G06K 7/00* (2006.01)

(52) U.S. Cl.
USPC ........... 382/312; 382/314; 382/317; 382/321; 358/474

(58) Field of Classification Search
USPC .......... 382/312, 314, 315, 321, 317; 358/474, 358/475
See application file for complete search history.

(56) References Cited

U.S. PATENT DOCUMENTS

| | | |
|---|---|---|
| 4,288,078 A | 9/1981 | Lugo |
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 4,931,865 A | 6/1990 | Scarampi |
| 5,101,444 A | 3/1992 | Wilson et al. |
| 5,148,154 A | 9/1992 | MacKay et al. |
| 5,175,641 A | 12/1992 | Boerstler et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |

(Continued)

FOREIGN PATENT DOCUMENTS

| | | |
|---|---|---|
| CA | 2775700 | 7/2012 |
| CN | 101202994 | 6/2008 |

(Continued)

OTHER PUBLICATIONS

"International Search Report", Mailed Date: Nov. 30, 2012, Application No. PCT/US2012/034641, Filed Date: Apr. 23, 2012, pp. 9.

(Continued)

*Primary Examiner* — Yosef Kassa
(74) *Attorney, Agent, or Firm* — Wolfe-SBMC

(57) ABSTRACT

Laser diode mode techniques are described. In one or more implementations, one or more laser diodes of a computing device are caused to operate below a lasing threshold to illuminate at least part of a physical surroundings of the computing device. One or more images of the illuminated physical surroundings are captured by a camera of the computing device and one or more inputs are recognized from the captured one or more images for interaction with a user interface displayed by the computing device.

17 Claims, 6 Drawing Sheets

(56) References Cited

U.S. PATENT DOCUMENTS

| | | |
|---|---|---|
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,528,263 A | 6/1996 | Platzker et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,581,276 A | 12/1996 | Cipolla et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,801,704 A | 9/1998 | Oohara et al. |
| 5,828,779 A | 10/1998 | Maggioni |
| 5,875,108 A | 2/1999 | Hoffberg et al. |
| 5,877,503 A | 3/1999 | Neriishi |
| 5,877,803 A | 3/1999 | Wee et al. |
| 5,904,484 A | 5/1999 | Burns |
| 5,913,727 A | 6/1999 | Ahdoot |
| 5,933,125 A | 8/1999 | Fernie et al. |
| 5,980,256 A | 11/1999 | Carmein |
| 5,989,157 A | 11/1999 | Walton |
| 5,995,649 A | 11/1999 | Marugame |
| 6,002,808 A | 12/1999 | Freeman |
| 6,005,548 A | 12/1999 | Latypov et al. |
| 6,009,210 A | 12/1999 | Kang |
| 6,054,991 A | 4/2000 | Crane et al. |
| 6,057,909 A | 5/2000 | Yahav et al. |
| 6,066,075 A | 5/2000 | Poulton |
| 6,072,494 A | 6/2000 | Nguyen |
| 6,073,489 A | 6/2000 | French et al. |
| 6,075,895 A | 6/2000 | Qiao et al. |
| 6,077,201 A | 6/2000 | Cheng |
| 6,098,458 A | 8/2000 | French et al. |
| 6,100,517 A | 8/2000 | Yahav et al. |
| 6,100,896 A | 8/2000 | Strohecker et al. |
| 6,101,289 A | 8/2000 | Kellner |
| 6,111,580 A | 8/2000 | Kazama et al. |
| 6,115,482 A | 9/2000 | Sears |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,181,472 B1 * | 1/2001 | Liu .................. 359/618 |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,222,465 B1 | 4/2001 | Kumar et al. |
| 6,226,388 B1 | 5/2001 | Qian et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,291,816 B1 * | 9/2001 | Liu .................. 250/234 |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,377,296 B1 | 4/2002 | Zlatsin et al. |
| 6,384,819 B1 | 5/2002 | Hunter |
| 6,411,744 B1 | 6/2002 | Edwards |
| 6,421,453 B1 | 7/2002 | Kanevsky et al. |
| 6,430,997 B1 | 8/2002 | French et al. |
| 6,476,834 B1 | 11/2002 | Doval et al. |
| 6,496,598 B1 | 12/2002 | Harman |
| 6,498,628 B2 | 12/2002 | Iwamura |
| 6,502,515 B2 | 1/2003 | Burckhardt et al. |
| 6,503,195 B1 | 1/2003 | Keller et al. |
| 6,512,838 B1 | 1/2003 | Rafii et al. |
| 6,514,081 B1 | 2/2003 | Mengoli |
| 6,525,827 B2 * | 2/2003 | Liu .................. 356/602 |
| 6,539,931 B2 | 4/2003 | Trajkovic et al. |
| 6,570,555 B1 | 5/2003 | Prevost et al. |
| 6,591,236 B2 | 7/2003 | Lewis et al. |
| 6,594,616 B2 | 7/2003 | Zhang et al. |
| 6,615,177 B1 | 9/2003 | Rapp et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,674,877 B1 | 1/2004 | Jojic et al. |
| 6,681,031 B2 | 1/2004 | Cohen et al. |
| 6,714,665 B1 | 3/2004 | Hanna et al. |
| 6,730,913 B2 | 5/2004 | Remillard et al. |
| 6,731,799 B1 | 5/2004 | Sun et al. |
| 6,738,066 B1 | 5/2004 | Nguyen |
| 6,750,848 B1 | 6/2004 | Pryor |
| 6,765,726 B2 | 7/2004 | French et al. |
| 6,771,277 B2 | 8/2004 | Ohba |
| 6,778,171 B1 | 8/2004 | Kikinis |
| 6,788,809 B1 | 9/2004 | Grzeszczuk et al. |
| 6,801,637 B2 | 10/2004 | Voronka et al. |
| 6,856,827 B2 | 2/2005 | Selley et al. |
| 6,868,383 B1 | 3/2005 | Bangalore et al. |
| 6,873,723 B1 | 3/2005 | Aucsmith et al. |
| 6,876,496 B2 | 4/2005 | French et al. |
| 6,881,526 B2 * | 4/2005 | Bobeck et al. .................. 430/30 |
| 6,937,742 B2 | 8/2005 | Roberts et al. |
| 6,950,534 B2 | 9/2005 | Cohen et al. |
| 7,003,134 B1 | 2/2006 | Covell et al. |
| 7,006,236 B2 | 2/2006 | Tomasi et al. |
| 7,007,236 B2 | 2/2006 | Dempski et al. |
| 7,028,001 B1 | 4/2006 | Muthuswamy et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,042,442 B1 | 5/2006 | Kanevsky et al. |
| 7,050,177 B2 | 5/2006 | Tomasi et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,096,454 B2 | 8/2006 | Damm et al. |
| 7,113,918 B1 | 9/2006 | Ahmad et al. |
| 7,120,880 B1 | 10/2006 | Dryer et al. |
| 7,121,946 B2 | 10/2006 | Paul et al. |
| 7,134,130 B1 | 11/2006 | Thomas |
| 7,145,330 B2 * | 12/2006 | Xiao .................. 324/244 |
| 7,151,530 B2 | 12/2006 | Roeber et al. |
| 7,155,305 B2 | 12/2006 | Hayes et al. |
| 7,170,492 B2 | 1/2007 | Bell |
| 7,170,605 B2 * | 1/2007 | Cromwell et al. .................. 356/417 |
| 7,184,048 B2 | 2/2007 | Hunter |
| 7,202,898 B1 | 4/2007 | Braun et al. |
| 7,212,665 B2 | 5/2007 | Yang et al |
| 7,214,932 B2 * | 5/2007 | Brunfeld et al. .................. 250/234 |
| 7,217,020 B2 | 5/2007 | Finch |
| 7,222,078 B2 | 5/2007 | Abelow |
| 7,224,384 B1 | 5/2007 | Iddan et al. |
| 7,227,526 B2 | 6/2007 | Hildreth et al. |

(56) References Cited

U.S. PATENT DOCUMENTS

| | | | |
|---|---|---|---|
| 7,259,747 B2 | 8/2007 | Bell | |
| 7,293,356 B2 | 11/2007 | Sohn et al. | |
| 7,308,112 B2 | 12/2007 | Fujimura et al. | |
| 7,310,431 B2 | 12/2007 | Gokturk et al. | |
| 7,317,836 B2 | 1/2008 | Fujimura et al. | |
| 7,340,077 B2 | 3/2008 | Gokturk et al. | |
| 7,348,963 B2 | 3/2008 | Bell | |
| 7,359,121 B2 | 4/2008 | French et al. | |
| 7,367,887 B2 | 5/2008 | Watabe et al. | |
| 7,379,563 B2 | 5/2008 | Shamaie | |
| 7,379,566 B2 | 5/2008 | Hildreth | |
| 7,389,591 B2 | 6/2008 | Jaiswal et al. | |
| 7,412,077 B2 | 8/2008 | Li et al. | |
| 7,421,093 B2 | 9/2008 | Hildreth et al. | |
| 7,430,312 B2 | 9/2008 | Gu | |
| 7,435,941 B2 * | 10/2008 | Ayres | 250/221 |
| 7,436,496 B2 | 10/2008 | Kawahito | |
| 7,450,736 B2 | 11/2008 | Yang et al. | |
| 7,452,275 B2 | 11/2008 | Kuraishi | |
| 7,460,690 B2 | 12/2008 | Cohen et al. | |
| 7,487,375 B2 | 2/2009 | Lourie et al. | |
| 7,489,812 B2 | 2/2009 | Fox et al. | |
| 7,512,889 B2 | 3/2009 | Newell et al. | |
| 7,536,032 B2 | 5/2009 | Bell | |
| 7,555,142 B2 | 6/2009 | Hildreth et al. | |
| 7,560,701 B2 | 7/2009 | Oggier et al. | |
| 7,568,116 B2 | 7/2009 | Dooley et al. | |
| 7,570,805 B2 | 8/2009 | Gu | |
| 7,574,020 B2 | 8/2009 | Shamaie | |
| 7,576,727 B2 | 8/2009 | Bell | |
| 7,590,262 B2 | 9/2009 | Fujimura et al. | |
| 7,593,552 B2 | 9/2009 | Higaki et al. | |
| 7,598,942 B2 | 10/2009 | Underkoffler et al. | |
| 7,607,509 B2 | 10/2009 | Schmiz et al. | |
| 7,620,202 B2 | 11/2009 | Fujimura et al. | |
| 7,627,139 B2 | 12/2009 | Marks et al. | |
| 7,636,456 B2 | 12/2009 | Collins et al. | |
| 7,640,304 B1 | 12/2009 | Goldscheider | |
| 7,643,056 B2 | 1/2010 | Silsby | |
| 7,668,340 B2 | 2/2010 | Cohen et al. | |
| 7,680,298 B2 | 3/2010 | Roberts et al. | |
| 7,683,954 B2 | 3/2010 | Ichikawa et al. | |
| 7,684,592 B2 | 3/2010 | Paul et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,739,140 B2 | 6/2010 | Vinson et al. | |
| 7,746,345 B2 | 6/2010 | Hunter | |
| 7,760,182 B2 | 7/2010 | Ahmad et al. | |
| 7,764,311 B2 | 7/2010 | Bill | |
| 7,770,136 B2 | 8/2010 | Beeck et al. | |
| 7,809,167 B2 | 10/2010 | Bell | |
| 7,814,518 B2 | 10/2010 | Ducheneaut et al. | |
| 7,834,846 B1 | 11/2010 | Bell | |
| 7,836,480 B1 | 11/2010 | Harvey et al. | |
| 7,852,262 B2 | 12/2010 | Namineni et al. | |
| 7,889,073 B2 | 2/2011 | Zalewski | |
| 7,895,076 B2 | 2/2011 | Kutaragi et al. | |
| RE42,256 E | 3/2011 | Edwards | |
| 7,898,522 B2 | 3/2011 | Hildreth et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 8,081,302 B2 * | 12/2011 | Paluszek et al. | 356/9 |
| 8,189,053 B2 * | 5/2012 | Pryor | 348/207.11 |
| 8,418,085 B2 | 4/2013 | Snook et al. | |
| 2002/0041327 A1 | 4/2002 | Hildreth et al. | |
| 2002/0073417 A1 | 6/2002 | Kondo et al. | |
| 2002/0120925 A1 | 8/2002 | Logan | |
| 2002/0144259 A1 | 10/2002 | Gutta et al. | |
| 2002/0174445 A1 | 11/2002 | Miller et al. | |
| 2003/0001846 A1 | 1/2003 | Davis et al. | |
| 2003/0005439 A1 | 1/2003 | Rovira | |
| 2003/0007018 A1 | 1/2003 | Seni et al. | |
| 2003/0033600 A1 | 2/2003 | Cliff et al. | |
| 2003/0093784 A1 | 5/2003 | Dimitrova et al. | |
| 2003/0118974 A1 | 6/2003 | Obrador | |
| 2003/0141360 A1 | 7/2003 | De Leo et al. | |
| 2004/0001616 A1 | 1/2004 | Gutta et al. | |
| 2004/0046736 A1 | 3/2004 | Pryor et al. | |
| 2004/0056907 A1 | 3/2004 | Sharma et al. | |
| 2004/0068409 A1 | 4/2004 | Tanaka et al. | |
| 2004/0070573 A1 | 4/2004 | Graham | |
| 2004/0113933 A1 | 6/2004 | Guler | |
| 2004/0155962 A1 | 8/2004 | Marks | |
| 2004/0168190 A1 | 8/2004 | Saari et al. | |
| 2004/0189720 A1 | 9/2004 | Wilson et al. | |
| 2004/0193413 A1 | 9/2004 | Wilson et al. | |
| 2004/0207597 A1 | 10/2004 | Marks | |
| 2005/0059488 A1 | 3/2005 | Larsen et al. | |
| 2005/0082480 A1 | 4/2005 | Wagner et al. | |
| 2005/0190973 A1 | 9/2005 | Kristensson et al. | |
| 2005/0212767 A1 | 9/2005 | Marvit et al. | |
| 2005/0215319 A1 | 9/2005 | Rigopulos et al. | |
| 2005/0223237 A1 | 10/2005 | Barletta et al. | |
| 2005/0229199 A1 | 10/2005 | Yabe | |
| 2005/0234998 A1 | 10/2005 | Lesandrini et al. | |
| 2005/0289582 A1 | 12/2005 | Tavares et al. | |
| 2006/0031776 A1 | 2/2006 | Glein et al. | |
| 2006/0031786 A1 | 2/2006 | Hillis et al. | |
| 2006/0055685 A1 | 3/2006 | Rimas-Ribikauskas | |
| 2006/0073816 A1 | 4/2006 | Kim et al. | |
| 2006/0101349 A1 | 5/2006 | Lieberman et al. | |
| 2006/0123360 A1 | 6/2006 | Anwar et al. | |
| 2006/0174313 A1 | 8/2006 | Ducheneaut et al. | |
| 2006/0188144 A1 | 8/2006 | Sasaki et al. | |
| 2006/0188234 A1 | 8/2006 | Takeshita | |
| 2006/0210958 A1 | 9/2006 | Rimas-Ribikauskas | |
| 2006/0218573 A1 | 9/2006 | Proebstel | |
| 2006/0239558 A1 | 10/2006 | Rafii et al. | |
| 2006/0253793 A1 | 11/2006 | Zhai et al. | |
| 2006/0262116 A1 | 11/2006 | Moshiri et al. | |
| 2006/0282856 A1 | 12/2006 | Errico et al. | |
| 2007/0013718 A1 | 1/2007 | Ohba | |
| 2007/0060336 A1 | 3/2007 | Marks et al. | |
| 2007/0075978 A1 | 4/2007 | Chung | |
| 2007/0098222 A1 | 5/2007 | Porter et al. | |
| 2007/0143715 A1 | 6/2007 | Hollins et al. | |
| 2007/0150281 A1 | 6/2007 | Hoff | |
| 2007/0150916 A1 | 6/2007 | Begole et al. | |
| 2007/0214292 A1 | 9/2007 | Hayes et al. | |
| 2007/0216894 A1 | 9/2007 | Garcia et al. | |
| 2007/0219430 A1 | 9/2007 | Moore | |
| 2007/0260984 A1 | 11/2007 | Marks et al. | |
| 2007/0271580 A1 | 11/2007 | Tischer et al. | |
| 2007/0279485 A1 | 12/2007 | Ohba et al. | |
| 2007/0283296 A1 | 12/2007 | Nilsson | |
| 2007/0298882 A1 | 12/2007 | Marks et al. | |
| 2008/0001951 A1 | 1/2008 | Marks et al. | |
| 2008/0016544 A1 | 1/2008 | Lee et al. | |
| 2008/0018591 A1 | 1/2008 | Pittel et al. | |
| 2008/0026838 A1 | 1/2008 | Dunstan et al. | |
| 2008/0027984 A1 | 1/2008 | Perdomo | |
| 2008/0033790 A1 | 2/2008 | Nickerson et al. | |
| 2008/0059578 A1 | 3/2008 | Albertson et al. | |
| 2008/0062257 A1 | 3/2008 | Corson | |
| 2008/0081694 A1 | 4/2008 | Hong et al. | |
| 2008/0091512 A1 | 4/2008 | Marci et al. | |
| 2008/0100620 A1 | 5/2008 | Nagai et al. | |
| 2008/0100825 A1 | 5/2008 | Zalewski | |
| 2008/0124690 A1 | 5/2008 | Redlich | |
| 2008/0126937 A1 | 5/2008 | Pachet | |
| 2008/0134102 A1 | 6/2008 | Movold et al. | |
| 2008/0151113 A1 | 6/2008 | Park | |
| 2008/0152191 A1 | 6/2008 | Fujimura et al. | |
| 2008/0163130 A1 | 7/2008 | Westerman | |
| 2008/0163283 A1 | 7/2008 | Tan et al. | |
| 2008/0178126 A1 | 7/2008 | Beeck | |
| 2008/0215972 A1 | 9/2008 | Zalewski et al. | |
| 2008/0215973 A1 | 9/2008 | Zalewski et al. | |
| 2008/0234023 A1 | 9/2008 | Mullahkhel et al. | |

(56) References Cited

U.S. PATENT DOCUMENTS

| | | |
|---|---|---|
| 2009/0013366 A1 | 1/2009 | You et al. |
| 2009/0025024 A1 | 1/2009 | Beser et al. |
| 2009/0027337 A1 | 1/2009 | Hildreth |
| 2009/0051648 A1 | 2/2009 | Shamaie et al. |
| 2009/0070798 A1 | 3/2009 | Lee et al. |
| 2009/0072992 A1 | 3/2009 | Yun |
| 2009/0073136 A1 | 3/2009 | Choi |
| 2009/0085864 A1 | 4/2009 | Kutliroff et al. |
| 2009/0094627 A1 | 4/2009 | Lee et al. |
| 2009/0094629 A1 | 4/2009 | Lee et al. |
| 2009/0094630 A1 | 4/2009 | Brown |
| 2009/0106645 A1 | 4/2009 | Knobel |
| 2009/0112817 A1 | 4/2009 | Jung et al. |
| 2009/0116684 A1 | 5/2009 | Andreasson |
| 2009/0141933 A1 | 6/2009 | Wagg |
| 2009/0146775 A1 | 6/2009 | Bonnaud et al. |
| 2009/0157472 A1 | 6/2009 | Burazin et al. |
| 2009/0167679 A1 | 7/2009 | Klier et al. |
| 2009/0175540 A1 | 7/2009 | Dariush et al. |
| 2009/0178097 A1 | 7/2009 | Kim et al. |
| 2009/0183125 A1 | 7/2009 | Magal et al. |
| 2009/0195392 A1 | 8/2009 | Zalewski |
| 2009/0217315 A1 | 8/2009 | Malik et al. |
| 2009/0221368 A1 | 9/2009 | Yen et al. |
| 2009/0234718 A1 | 9/2009 | Green |
| 2009/0235195 A1 | 9/2009 | Shin et al. |
| 2009/0251425 A1 | 10/2009 | Sohn et al. |
| 2009/0252423 A1 | 10/2009 | Zhu et al. |
| 2009/0296002 A1 | 12/2009 | Lida et al. |
| 2009/0303231 A1 | 12/2009 | Robinet et al. |
| 2010/0007801 A1 | 1/2010 | Cooper et al. |
| 2010/0026914 A1 | 2/2010 | Chung et al. |
| 2010/0033427 A1 | 2/2010 | Marks et al. |
| 2010/0070913 A1 | 3/2010 | Murrett et al. |
| 2010/0070987 A1 | 3/2010 | Amento et al. |
| 2010/0070992 A1 | 3/2010 | Morris et al. |
| 2010/0073329 A1 | 3/2010 | Raman et al. |
| 2010/0083373 A1 | 4/2010 | White et al. |
| 2010/0086204 A1 | 4/2010 | Lessing |
| 2010/0093435 A1 | 4/2010 | Glaser et al. |
| 2010/0095206 A1 | 4/2010 | Kim |
| 2010/0107184 A1 | 4/2010 | Shintani |
| 2010/0138797 A1 | 6/2010 | Thorn |
| 2010/0146389 A1 | 6/2010 | Yoo et al. |
| 2010/0151946 A1 | 6/2010 | Wilson et al. |
| 2010/0153984 A1 | 6/2010 | Neufeld |
| 2010/0169905 A1 | 7/2010 | Fukuchi et al. |
| 2010/0207874 A1 | 8/2010 | Yuxin et al. |
| 2010/0211439 A1 | 8/2010 | Marci et al. |
| 2010/0235667 A1 | 9/2010 | Mucignat et al. |
| 2010/0248832 A1 | 9/2010 | Esaki et al. |
| 2010/0251280 A1 | 9/2010 | Sofos et al. |
| 2010/0251300 A1 | 9/2010 | Fahey et al. |
| 2010/0278393 A1 | 11/2010 | Snook et al. |
| 2010/0286983 A1 | 11/2010 | Cho |
| 2010/0295783 A1 | 11/2010 | El Dokor et al. |
| 2010/0306712 A1 | 12/2010 | Snook et al. |
| 2010/0332842 A1 | 12/2010 | Kalaboukis et al. |
| 2011/0007142 A1 | 1/2011 | Perez et al. |
| 2011/0016102 A1 | 1/2011 | Hawthorne et al. |
| 2011/0037866 A1 | 2/2011 | Iwamoto |
| 2011/0038547 A1 | 2/2011 | Hill |
| 2011/0066682 A1 | 3/2011 | Aldunate et al. |
| 2011/0072448 A1 | 3/2011 | Stiers et al. |
| 2011/0077513 A1 | 3/2011 | Rofougaran |
| 2011/0085705 A1 | 4/2011 | Izadi et al. |
| 2011/0145040 A1 | 6/2011 | Zahn et al. |
| 2011/0145041 A1 | 6/2011 | Salamatov et al. |
| 2011/0164143 A1 | 7/2011 | Shintani et al. |
| 2011/0208582 A1 | 8/2011 | Hoyle |
| 2011/0214141 A1 | 9/2011 | Oyaizu |
| 2011/0246572 A1 | 10/2011 | Kollenkark et al. |
| 2011/0263946 A1 | 10/2011 | el Kaliouby et al. |
| 2011/0264531 A1 | 10/2011 | Bhatia et al. |
| 2011/0321096 A1 | 12/2011 | Landow et al. |
| 2012/0051719 A1 | 3/2012 | Marvit |
| 2012/0060176 A1 | 3/2012 | Chai et al. |
| 2012/0084812 A1 | 4/2012 | Thompson et al. |
| 2012/0109726 A1 | 5/2012 | Ruffini |
| 2012/0124603 A1 | 5/2012 | Amada |
| 2012/0192233 A1 | 7/2012 | Wong |
| 2012/0209715 A1 | 8/2012 | Lotan et al. |
| 2012/0226981 A1 | 9/2012 | Clavin |
| 2012/0280897 A1 | 11/2012 | Balan et al. |
| 2012/0304059 A1 | 11/2012 | McCloskey |
| 2012/0306734 A1 | 12/2012 | Kim et al. |
| 2013/0014144 A1 | 1/2013 | Bhatia et al. |
| 2013/0054652 A1 | 2/2013 | Antonelli et al. |
| 2013/0136358 A1 | 5/2013 | Dedhia et al. |
| 2013/0145384 A1 | 6/2013 | Krum |
| 2013/0145385 A1 | 6/2013 | Aghajanyan |
| 2013/0152113 A1 | 6/2013 | Conrad |
| 2013/0159555 A1 | 6/2013 | Rosser |
| 2013/0198690 A1 | 8/2013 | Barsoum et al. |
| 2013/0232515 A1 | 9/2013 | Rivera et al. |

FOREIGN PATENT DOCUMENTS

| | | |
|---|---|---|
| CN | 101254344 | 6/2010 |
| EP | 0583061 | 2/1994 |
| GB | 2423808 | 6/2006 |
| GB | 2459707 | 11/2009 |
| JP | 08044490 | 2/1996 |
| WO | WO-9310708 | 6/1993 |
| WO | WO-9717598 | 5/1997 |
| WO | WO-9915863 | 4/1999 |
| WO | WO-9944698 | 9/1999 |
| WO | WO-0159975 | 8/2001 |
| WO | WO-0169799 | 9/2001 |
| WO | WO-02082249 | 10/2002 |
| WO | WO-03001722 | 1/2003 |
| WO | WO-03015056 | 2/2003 |
| WO | WO-03046706 | 6/2003 |
| WO | WO-03054683 | 7/2003 |
| WO | WO-03073359 | 9/2003 |
| WO | WO-2009059065 | 5/2009 |
| WO | WO-03071410 | 8/2010 |

OTHER PUBLICATIONS

"Foreign Notice of Allowance", Canadian Application No. 2775700, (Jan. 3, 2013),1 page.

"Foreign Office Action", Canadian Application No. 2775814, (Dec. 14, 2012), 3 pages.

"Non-Final Office Action", U.S. Appl. No. 12/794,406, (Sep. 14, 2012), 17 pages.

"Non-Final Office Action", U.S. Appl. No. 13/309,589, (Dec. 18, 2012), 10 pages.

"Non-Final Office Action", U.S. Appl. No. 13/316,351, (Feb. 14, 2013), 16 pages.

"Non-Final Office Action", U.S. Appl. No. 13/439,284, (Feb. 25, 2013), 31 pages.

"Notice of Allowance", U.S. Appl. No. 12/474,453, (Dec. 12, 2012), 8 pages.

"Advisory Action", U.S. Appl. No. 10/396,653, (May 2, 2007),3 pages.

"Advisory Action", U.S. Appl. No. 10/396,653, (May 23, 2008),3 pages.

"Affdex: Measuring Emotion over the Web", *Affectiva*, Retrieved from: <http://www.affectiva.com/affdex/> on Nov. 4, 2011,3 pages.

"Application Titled "Controlling Electronic Devices in a Multimedia System Through a Natural User Interface"", U.S. Appl. No. 13/038,024, filed Mar. 2, 2011, pp. 1-46.

"Application Titled "Interaction with Networked Screen Content Via Motion Sensing Device in Retail Setting"", U.S. Appl. No. 13/025,180, filed Feb. 11, 2011, pp. 1-23.

"Commanding Overview", *MSDN*, retrieved from <http://msdn.microsoft.com/en-us/library/ms752308.aspx> on Sep. 27, 2011,11 pages.

"Designing CEC into your next HDMI Product", *Quantum Data White Paper*, Retrieved from the Internet:<URL:http://www.

(56) References Cited

OTHER PUBLICATIONS quantumdata.com/pdf/CEC_white_paper.pdf> *Quantum Data, Inc.*, Elgin, IL, USA, (May 13, 2006),12 pages.
"Final Office Action", U.S. Appl. No. 10/396,653, (Feb. 20, 2009),12 pages.
"Final Office Action", U.S. Appl. No. 10/396,653, (Feb. 25, 2008),20 pages.
"Final Office Action", U.S. Appl. No. 10/396,653, (Feb. 26, 2007),18 pages.
"Final Office Action", U.S. Appl. No. 11/626,794, (Jun. 11, 2009),14 pages.
"Future Media Internet Research Challenges and the Road Ahead", *European Commission Information Society and Media*, Available at <http://www.gatv.ssr.upm.es/nextmedia/images/fmi-tf-white_paper_042010.pdf>,(Apr. 2010),31 pages.
"GWindows: Light-Weight Stereo Vision for Interaction", http://research.microsoft.com/~nuria/gwindows/htm, (Jul. 8, 2005),2 pages.
"International Search Report", PCT Application No. PCT/US2010/036005, (Dec. 24, 2010),3 pages.
"KinEmote uses Kinect to translate key strokes for Windows applications", techshout.com [online], Retrieved from the Internet<URL:http://www.techshout.com/gaming/2010/28/kinemote-uses-kinect-to-translate-key-strokes-for-windows-applications/>,(Dec. 28, 2010),2 pages.
"Non-Final Office Action", U.S. Appl. No. 10/396,653, (Sep. 6, 2007),17 pages.
"Non-Final Office Action", U.S. Appl. No. 10/396,653, (Sep. 8, 2008),13 pages.
"Non-Final Office Action", U.S. Appl. No. 10/396,653, (Sep. 19, 2006),24 pages.
"Non-Final Office Action", U.S. Appl. No. 11/626,794, (Oct. 27, 2009),15 pages.
"Non-Final Office Action", U.S. Appl. No. 11/626,794, (Dec. 23, 2008),18 pages.
"Non-Final Office Action", U.S. Appl. No. 12/474,453, (Sep. 6, 2011),10.
"Notice of Allowance", U.S. Appl. No. 10/396,653, (Nov. 19, 2009),7 pages.
"Notice of Allowance", U.S. Appl. No. 11/626,794 (May 13, 2010),4 pages.
"Simulation and Training", Division Incorporated,(1994),6 Pages.
"The Case for Kinect", *Eurogamer* [online] Retrieved from the Internet on Aug. 20, 2010: URL:<http://www.eurogamer.net/articles/digitalfoundry-the-case-for-kinect-article?page=2>., (Aug. 7, 2010),pp. 1-7.
"U.S. Appl. No. 12/794,406", filed Jun. 4, 2010, 37 pages.
"Virtual High Anxiety", *Tech update*, (Aug. 1995),1 Page.
Agarwal, Ankur et al., "High Precision Multi-touch Sensing on Surfaces using Overhead Cameras", *Second Annual IEEE International Workshop on Horizontal Interactive Human-Computer System*, available at <<http://ieeexplore.ieee.org/stamp/stamp.jsp?tp=&arnumber=4384130>>,(Nov. 19, 2007),4 pages.
Aggarwal, et al., "Human Motion Analysis: A Review", *IEEE Nonrigid and Articulated motion Workshop*, University of Texas at Austin, Austin, TX.,(1997),pp. 90-102.
Ali, Azarbayejani et al., "Real-Time Self-Calibrating Stereo Person Tracking Using 3-D Shape Estimation from Blob Features", *Proceedings of ICPR*, Vienna, Austria, (Aug. 1996),pp. 627-632.
Althoff, Frank et al., "Using Multimodal Interaction to Navigate in Arbitrary Virtual VRML Worlds", *PUI 2001 Orlando*, FL USA, available at <http://citeseerx.ist.psu.edu/viewdoc/download?doi=10.1.1.16.8034&rep=rep1&type=pdf>,(2001),8 pages.
Argyros, et al., "Vision-Based Interpretation of Hand Gestures for Remote Control of a Computer Mouse", Retrieved from: <http://www.ics.forth.gr/~argyros/mypapers/2006_05_hci$_{13}$ virtualmouse.pdf> on Oct. 31, 2007, (2006),pp. 40-51.
Azarbayejani, et al., "Visually Controlled Graphics", IEEE Transactions On Pattern Analysis and Machine Intelligence, vol. 15, No. 6, (Jun. 1993),pp. 602-605.

Azoz, Yusuf et al., "Reliable Tracking of Human Arm Dynamics by Multiple Cue Integration and Constraint Fusion", *IEEE Conference on Computer Vision and Pattern Recognition*, (1998),6 pages.
Baudel, Thomas et al., "Charade: Remote Control of Objects using Free-Hand Gestures", *Communications of the ACM*, vol. 36. No. 7, (Jul. 1993),10 pages.
Becker, David A., "Sensei: Aa Real-Time Recognition, Feedback and Training System for T'ai Chi Gestures", http://citeseer.ist.psu.edu/cache/papers/cs/405/ftp:zSzzSzwhitechapel.media.mit.eduzSzpubzSztech-reporterzsSzTR-426pdf/becker97sensei.pdf, (Jun. 1993),50 pages.
Berard, Francois "The Perceptual Window-Head Motion as a New Input Stream", *Proceedings of the Seventh IFIP Conference of Human-Computer Interaction* (1999),238-244.
Bhuiyan, Moniruzzaman et al., "Gesture-controlled user interfaces, what have we done and what's next?", Retrieved at <<http://www.newi.ac.uk/computing/research/pubs/SEIN_BP.pdf>>, (Nov. 27, 2009),10 pages.
Bobic, Nick "Rotating Objects Using Quaternions", Retrieved from the Internet on Aug. 20, 2010: URL http://www.gamasutra.com/view/feature/3278/rotating_objects_quarternions.php?page=2>., (Jul. 5, 1998),14 pages.
Bowman, Doug A., et al., "New Directions in 3D User Interfaces", *The International Journal of Virtual Reality*, retrieved from <http://citeseerx.ist.psu.edu/viewdoc/download?doi=10.1.1.99.1121&rep=rep1&type=pdf> on Nov. 15, 2011,(2006),pp. 3-14.
Breen, David et al., "Interactive Occlusion and Collision of Real and Virtual Objects in Augmented Reality", *Technical report ECRC-95-02 European Computer-Industry Research Centre GmbH*, Munich, Germany, (1995),22 Pages.
Brogan, David et al., "Dynamically Simulated Characters in Virtual Environments", *vol. 18, Issue 5, IEEE Computer Graphics and Applications*, (Sep./Oct. 1998),pp. 58-69.
Buxton, William et al., "A Study of Two-Handed Input", *Proceedings of CHI'86* ,(1986),pp. 321-326.
Cedras, Claudette et al., "Motion-based Recognition: A Survey", *IEEE Proceedings, Image and Vision Computing, vol. 13, No. 2*, (Mar. 1995),pp. 129-155.
Crawford, Stephanie "How Microsoft Kinect Works", Howstuffworks[online] Retrieved from the Internet on Aug. 19, 2010: URL: <http://electronics.howstuffworks.com/microsoft-kinect.htm/printable>., pp. 1-5.
Dalton, Angela B., et al., "Sensing User Intention and Context for Energy Management", *Duke University, Department of Computer Science*, Retrieved from the Internet<URL:http://www.cs.duke/edu/ari/millywatt/faceoff.pdf>, (Feb. 23, 2003),5 pages.
Darrell, T et al., "Integrated Person Tracking Using Stereo, Color and Pattern Detection", *Proceedings of the Conference on Computer Vision and Pattern Recognition*, (1998),pp. 601-609.
Fisher, et al., "Virtual Environment Display System", *ACM Workshop on Interactive 3D Graphics*, Chapel Hill, NC, (Oct. 1986),12 Pages.
Fitzgerald, et al., "Integration of Kinematic Analysis into Computer Games for Exercise", *Proceedings of CGames 2006—9th International Conference on Computer Games: AI, Animation, Mobile, Educational and Serious Games*, Dublin Ireland, (Nov. 2006),pp. 24-28.
Fitzgerald, Will et al., "Multimodal Event Parsing for Intelligent User Interfaces", *IUI Conference*, (Jan. 2003),8 pages.
Freed, Natalie "Toys Keeping in Touch: Technologies for Distance Play", Retrieved from <<http://people.ischool.berkeley.edu/~daniela/tei2010/gsc09e-freed.pdf>>, (Jan. 24, 2010),2 pages.
Freeman, William et al., "Television Control by Hand Gestures", *International Workshop on Automatic Face and Gesture Recognition*, (1995),pp. 179-183.
Gonzalez, Barb "HDMI CEC", Home Theater University [online] Retrieved from the Internet<URL:http://www.hometheatre.com/hookmeup/208hook>, (Mar. 24, 2008),3 pages.
Granieri, John P., et al., "Simulating Humans in VR", *The British Computer Society, Academic Press*, (Oct. 1994),15 Pages.
Grunder, Alexander "Updated: Xbox 360 Kinect Hand Gesture Media Controls, Voice Control, TV Video Chat.", eHomeUpgrade [online] retrieved from the internet:<URL:http://www.

(56) References Cited

OTHER PUBLICATIONS ehomeupgrade.com/2010/06/14/updated-xbox-360-kinect-hand-gesture-media-controls-voice-control-tv-video-chat/>, (Jun. 14, 2010),8 pages.

Guiard, Yves "Asymmetric Division of Labor in Human Skilled Bimanual Action: The Kinematic Chain as a Model", *Journal of Motor Behavior, vol. 19 Issue 4*, (1987),486-517.

Guler, Sadiye Z., "Split and Merge Behavior Analysis and Understanding Using Hidden Markov Models", (Oct. 8, 2002),21 pages.

Hasegawa, Shoichi et al., "Human-Scale Haptic Interaction with a Reactive Virtual Human in a Real-Time Physics Simulator", *ACM Computers in Entertainment, vol. 4, No. 3*, (Jul. 2006),12 Pages.

He, Lei "Generation of Human Body Models", *University of Auckland, New Zealand* (Apr. 2005),111 Pages.

Hongo, Hitoshi et al., "Focus of Attention for Face and Hand Gesture Recognition Using Multiple Cameras", *4th IEEE International Conference on Automatic Face and Gesture Recognition*, Grenoble, France, (Mar. 2000),pp. 156-161.

Horvitz, Eric "Principles of Mixed-Initiative User Interfaces", *Proceedings of CHI*, (1999),8 pages.

Horvitz, Eric et al., "A Computational Architecture for Conversation", *Proceedings of the Seventh International Conference on User Modeling*, (1999),pp. 201-210.

Hourcade, Juan P., "Architecture and Implementation of Java Package for Multiple Input Devices (MID)", *HCIL Technical Report No. 99-08* (May 1999); http://www.cs.umd.edu/hcil, (May 1999),7 pages.

Isard, Michael et al., "Condensation—Conditional Density Propagation for Visual Tracking", *International Journal of Computer Vision 29(1)*, Netherlands, (1998),pp. 5-28.

Jacko, "HDI Dune Prime 3.0 Part 2.", Retrieved from the internet: <URL:http://www.jacko.my/2010/06/hdi-dune-prime-30-part-2.html>, (Jun. 19, 2010),15 pages.

Jojic, Nebojsa et al., "Detection and Estimation of Pointing Gestures in Dense Disparity Maps", *Proceedings of IEEE International Conference on Automatic Face and Gesture Recognition*, (2000),pp. 1000-1007.

Kabbash, P. et al., "The "Prince" Technique: Fitts' Law and Selection Using Area Cursors", *Proceedings of CHI'95*, http://www.billbuxton.com/prince.html, (1995),pp. 273-279.

Kanade, et al., "Development of Video-Rate Stereo Machine", *Proceedings of 94 ARPA Image Understanding Workshop*, (1994),pp. 549-558.

Kanade, Takeo et al., "A Stereo Machine for Video-rate Dense Depth Mapping and Its New Applications", *IEEE Computer Society Conference on Computer Vision and Pattern Recognition*, The Robotics Institute, Carnegie Mellon University, Pittsburgh, PA,(1996),pp. 196-202.

Kim, Song-Gook et al., "Multi-Touch Tabletop Interface Technique for HCI", retrieved from <<http://210.119.33.7/apis6/paper/data/63-multi-touch%20tabl.pdf>> on Mar. 16, 2011,4 pages.

Kjeldsen, Frederik "Visual Interpretation of Hand Gestures as Practical Interface Modality", *Ph.D. Dissertation, Columbia University Department of Computer Science*, (1997),168 pages.

Klompmaker, Florian "D5.1—State of the art analysis and recommendations on 'Context Awareness', 'Human Computer Interaction' and 'Mobile Users Interfaces'", *Information Technology for European Advancement (ITEA), Local Mobile Services*, Retrieved from the Internet<URL:http://www.loms-itea.org/deliverables/LOMS_D5.1_v1.0.pdy>, (Jul. 2, 2007),55 pages.

Kohler, Marcus "Technical Details and Ergonomical Aspects of Gesture Recognition applied in Intelligent Home Environments", Germany, (1997),35 Pages.

Kohler, Markus "Special Topics of Gesture Recognition Applied in Intelligent Home Environments", *In Proceedings of the Gesture Workshop*, Germany, (1998),12 Pages.

Kohler, Markus "Vision Based Remote Control in Intelligent Home Environments", *University of Erlangen-Nuremberg*, Germany, (1996),8 Pages.

Kolsch, Mathias et al., "Vision-Based Interfaces for Mobility", Retrieved from <<http://ieeexplore.ieee.org/stamp/stamp.jsp?tp=&arnumber=1331713>>, (Aug. 22, 2004),9 pages.

Kwon, et al., "Combining Body Sensors and Visual Sensors for Motion Training", *Computer Graphics Laboratory*, http://graphics.ethz.ch/~dkwon/downloads/publications/ace05_ace.pdf, Downloaded 2009,(2005),pp. 1-8.

Latoschik, Marc E., "A User Interface Framework for Multimodal VR Interactions", *ICMI'05*, Trento, Italy, Oct. 4-6, 2005, available at <http://citeseerx.ist.psu.edu/viewdoc/download?doi=10.1.1.91.2941&rep=rep1&type=pdf>,(Oct. 4, 2005),8 pages.

Le, Nguyen T., "EmuPlayer: Music Recommendation System Based on User Emotion Using Vital-sensor", *Thesis, Keio University*, Available at <http://www.sfc.wide.ad.jp/thesis/2011/files/sunny-publish-thesis.pdf>,(2010),85 pages.

Leal, Anamary et al., "Initial Explorations into the User Experience of 3D File Browsing", Proceedings of HCI 2009, retrieved from <http://www.eecs.ucf.edu/isuelab/publications/pubs/p339-leal-3dfiles.pdf> on Nov. 15, 2011,(Sep. 2009),pp. 339-344.

Livingston, Mark A., "Vision-based Tracking with Dynamic Structured Light for Video See-through Augmented Reality", *TheUniversity of NorthCarolina at ChapelHill*, North Carolina, USA, (1998),145 Pages.

Long, Jr., Allan C., et al., "Implications for a Gesture Design Tool", *Proceedings of CHI'99*, (1999),pp. 40-47.

Maes, Pattie et al., "The ALIVE System: Wireless, Full-body, Interaction with Autonomous Agents", *ACM Multimedia Systems, Special Issue on Multimedia and Multisensory Virtual Worlds*, (Nov. 1995),17 pages.

Maltby, John R., "Using Perspective in 3D File Management: Rotating Windows and Billboarded Icons", *Proceedings of the International Conference on Computer Graphics, Imaging and Visualisation (CGIV'06)*, available at <http://ieeexplore.ieee.org/stamp/stamp.jsp?tp=&arnumber=1663764>,(Jul. 28, 2006),8 pages.

Martin, Benoit "VirHKey: A VIRtual Hyperbolic KEYboard with Gesture Interaction and Visual Feedback for Mobile Devices", http://delivery.acm.org/10.1145/1090000/1085794/p99-martin.pdf?key1=1085794&key2=4890534611&coll=portal&dl=ACM&CFID=11111111&CFTOKEN=2222222, (Sep. 2005),8 pages.

McCrae, James et al., "Exploring the Design Space of Multiscale 3D Orientation", *AVI '10* retrieved from <http://www.autodeskresearch.com/pdf/avi2010-final.pdf> on Nov. 15, 2011,(May 29, 2010),8 pages.

Mignot, Christopher et al., "An Experimental Study of Future 'Natural' Multimodal Human-Computer Interaction", *Proceedings of INTERCHI93*, (1993),pp. 67-68.

Minge, Michael "Dynamics of User Experience", *Workshop on Research Goals and Strategies for Studying User Experience and Emotion*, Available at <http://www.cs.uta.fi/~ux-emotion/submissions/Minge.pdf>,(2008),pp. 1-5.

Miyagawa, Ryohei et al., "CCD-Based Range-Finding Sensor", *IEEE Transactions on Electron Devices*,vol. 44, No. 10, (Oct. 1997),pp. 1648-1652.

Moeslund, Thomas B., et al., "A Survey of Computer Vision-Based Human Motion Capture", *Computer Vision and Image Understanding: CVIU*, vol. 81, No. 3 (2001),pp. 231-269.

Morency, Louis-Philippe et al., "Contextual Recognition of Head Gestures", Trento, Italy http://delivery.acm.org/10.1145/1090000/1088470/p18_morency.pdf?key1=1088470&key2=8870534611&coll=portal&dl=ACM&CFID=11111111&CFTOKEN=2222222, 7 pages.

Morrison, Gerald D., "A Camera-Based Touch Interface for Pervasive Displays", Retrieved from <<http://ubicomp.algoritmi.uminho.pt/perdisplay/docs/Morrison-Camera%20Touch_SV_Rev1.pdf>> on Mar. 16, 2011,7 pages.

Moscovich, Tomer "Multi-touch Interaction", *Brown University, CHI 2006*, Apr. 22-27, 2006, Montreal, Quebec, Canada, (Apr. 22, 2006),4 pages.

Moyle, et al., "Gesture Navigation: An Alternative 'Back' for the Future", *Proceedings of CHI'02*, (2002),pp. 882-823.

(56) References Cited

OTHER PUBLICATIONS

Nielsen, Michael et al., "A Procedure for Developing Intuitive and Ergonomic Gesture Interfaces for Man-Machine Interaction", *Technical Report CVMT 03-01, ISSN 1601-3646. CVMT, Aalborg University*, (Mar. 2003),12 pages.

Oh, Alice et al., "Evaluating Look-to-talk: A Gaze-Aware Interface in a Collaborative Environment", *CHI'02*, (2002),650-651.

Oviatt, Sharon "Ten Myths of Multimodal Interaction", *Communications of the ACM*. vol. 42, No. 11, (Nov. 1999),8 pages.

Parrish, Kevin "Microsoft Does Want Core Games, FPS for Kinect", *Tom's Guide: Tech for Real Life* [online], Retrieved from the Internet on Aug. 20, 2010: URL: <http://www.tomsguide.com/us/Core-Gamers-Kinect-FPS-Action,news-7195.html>., (Jun. 23, 2010),1 page.

Pavlou, Paul A., et al., "Measuring the Effects and Effectiveness of Interactive Advertising: A Research Agenda", *Journal of Interactive Advertising*, vol. 1, No. 1. (Fall 2000), Available at <http://scholar.google.co.in/scholar_url?hl=en&q=http://jiad.org/download%3Fp%3D6&sa=X&scisig=AAGBfm3He5PA4sgMGDXTyQuqaVQn4Q3nZw&oi=scholarr>,(Oct. 2000),pp. 62-78.

Pavlovic, Vladimir et al., "Visual Interpretation of Hand Gestures for Human-Computer Interaction: A Review", *IEEE Transactions on Pattern Analysis and Machine Intelligence*, vol. 19, No. 7, (Jul. 1997),pp. 677-695.

Qian, et al., "A Gesture-Driven Multimodal Interactive Dance System", *IEEE International Conference on Multimedia and Expo*, Taipei, (Jun. 2004),pp. 1579-1582.

Raymer, A "Gestures and Words: Facilitating Recovery in Aphasia", *The ASHA Leader*, http://www.asha.org/about/publications/leader-online/archives/2007/070619/f070619a.htm, (Jun. 19, 2007),6 pages.

Rigoll, Gerhard et al., "High Performance Real-Time Gesture Recognition Using Hidden Markov Models", *Gesture and Sign Language in Human-Computer Interaction*, vol. LNAI 1371, Frohlich, ed., (1997),pp. 69-80.

Rosenhahn, Bodo et al., "Automatic Human Model Generation", *University of Auckland (CITR)*, New Zealand, (2005),pp. 41-48.

Sakir, Samit "Kinect is your personal trainer in EA Sports Active 2", *Gamerss*[online] Retrieved from the Internet on Aug. 20, 2010: URL: <http://www.gamerss.co.uk/kinect-is-your-personal-trainer-in-ea-sports-active-2>., (Jul. 26, 2010),4 pages.

Schick, Alexander et al., "Extending Touch: Towards Interaction with Large-Scale Surfaces", *ITS '09*, Nov. 23-25 2009, Banff, Alberta, Canada, available at <<http://www.iosb.fraunhofer.de/servlet/is/33404/urn_nbn_de_0011-n-1159494.pdf>>,(Nov. 23, 2009),8 pages.

Schielel, Seth "A Home System Leaves Hand Controls in the Dust, Kinect by Microsoft Keeps You Entertained Hands Free", *The New York Times* [online] Retrieved from the Internet<URL:http://www.nytimes.com/2010/11/04/arts/television/04kinect.html>, (Nov. 4, 2010),3 pages.

Shao, Jiang et al., "An Open System Architecture for a Multimedia and Multimodal User Interface", *Japanese Society for Rehabilitation of Persons with Disabilities (JSRPD)*, Japan, (Aug. 24, 1998),8 Pages.

Sharma, et al., "Method of Visual and Acoustic Signal Co-Analysis for Co-Verbal Gesture Recognition", U.S. Appl. No. 60/413,998, (Sep. 19, 2002),16 pages.

Sharma, Rajeev M., et al., "Speech-Gesture Driven Multimodal Interfaces for Crisis Management", *Proceedings of IEEE Special Issue on Multimodal Human-Computer Interface*, (2003),28 pages.

Shen, Guobin et al., "Dita: Enabling Gesture-Based Human-Device Interaction using Mobile Phone", Retrieved at <<:http://research.microsoft.com/en-us/people/jackysh/dita.pdf>>, (Oct. 1, 2010),pp. 1-14.

Sheridan, Thomas et al., "Virtual Reality Check", *Technology Review*, vol. 96, No. 7, (Oct. 1993),9 Pages.

Shivappa, et al., "Person Tracking with Audio-Visual Cues Using the Iterative Decoding Framework", *IEEE Fifth International Conference on Advanced Video and Signal Based Surveillance, AVSS 08*, Santa Fe, NM, (Sep. 2008),260-267.

Simeone, Luca et al., "Toys++ AR Embodied Agents as Tools to Learn by Building", Retrieved from <<http://ieeexplore.ieee.org/stamp/stamp.jsp?arnumber=05572598>>, (Jul. 5, 2010),2 pages.

Stevens, Jane "Flights into Virtual Reality Treating Real World Disorders", *The Washington Post, Science Psychology*, (Mar. 27, 1995),2 Pages.

Tep, S. P., et al., "Web Site Quality Evaluation Combining Eyetracking and Physiological Measures to Self-Reported Emotions: An Exploratory Research", *Proceedings of Measuring Behavior 2008* (Maastricht, The Netherlands, Aug. 26-29, 2008), Retrieved from: <http://www.noldus.com/mb2008/individual_papers/FPS_eye_tracking/FPS_eye_tracking_Prom-Tep.pdf> on Oct. 4, 2011,(Aug. 26, 2008), pp. 224-225.

Tilley, Steve "E3 09: Project Natal exposed", *Load This* [online] Retrieved from the Internet<URL:http://blogs.canoe.ca/loadthis/general/e3-09-project-natal-exposed/>, (Jun. 1, 2009),4 pages.

Todd, Paul "Google Campaign Insights: Better Measurement for Display Advertising", Retrieved from: <http://adwordsagency.blogspot.com/2009/10/campaign-insights-better-measurement.html> on Nov. 14, 2011,(Oct. 19, 2009),3 pages.

Toyama, Kentaro et al., "Probabilistic Tracking in a Metric Space", *Eighth International Conference on Computer Vision*, Vancouver Canada, vol. 2, (Jul. 2001),8 pages.

Tresadern, Philip A., et al., "Visual Analysis of Articulated Motion", *DPhil Thesis, University of Oxford*, Oxford, U.K., (Oct. 12, 2006),1-171.

Vaucelle, Cati et al., "Picture This! Film Assembly Using Toy Gestures", Retrieved from <<http://web.media.mit.edu/~cati/PictureThis_Ubicomp.pdf>>, (2008),10 pages.

Wilson, Andrew et al., "GWindows: Towards Robust Perception-Based UI", *Microsoft Research*, (2003),pp. 1-8.

Wilson, et al., "Hidden Markov Models for Modeling and Recognizing Gesture Under Variation", *Hidden Markov Model: Applications in Computer Vision., T. Caelli, ed. World Scientific*, (2001),36 pages.

Worden, Aileen et al., "Making Computers Easier for Older Adults to Use: Area Cursors and Sticky Icons", *CHI 97*, Atlanta Georgia, USA, (1997),pp. 266-271.

Wren, Christopher et al., "Pfinder: Real-Time Tracking of the Human Body", *IEEE Transactions on Pattern Analysis and Machine Intelligence*, vol. 19, No. 7, (Jul. 1997),pp. 780-785.

Yakut, Isil D., et al., "User and Task Analysis of Multi-Level 3D File Browser", *Dept. of Computer Engineering, Bilkent University*, Ankara, Turkey, retrieved from <http://www.cs.bilkent.edu.tr/~cansin/projects/cs560-3dui/multi-level-3d-file-browser/3dui-report.pdf> on Nov. 15, 2011,4 pages.

Yoda, Ikushi et al., "Utilization of Stereo Disparity and Optical Flow Information for Human Interaction", *Proceedings of the Sixth International Conference on Computer Vision, IEEE Computer Society*, Washington D.C., USA, (1998),5 pages.

Zhai, Shumin et al., "The "Silk Cursor": Investigating Transparency for 3D Target Acquisition", *CHI 94*, (1994),pp. 273-279.

Zhang, Zhengyou "A Flexible New Technique for Camera Calibration", *IEEE Transactions on Pattern Analysis and Machine Intelligence*, vol. 22, No. 11, (Nov. 2000),pp. 1330-1334.

Zhang, Zhengyou "Flexible Camera Calibration by Viewing a Plane from Unknown Orientations", *Microsoft Research*, (1999),8 pages.

Zhao, Liang "Dressed Human Modeling, Detection, and Parts Localization", *The Robotics Institute, Carnegie Mellon University*, Pittsburgh, PA, (2001),121 Pages.

Boverie, et al., "Comparison of structured light and stereovision sensors for new airbag generations", Retrieved at <<http://homepages.laas.fr/lerasle/pdf/cep03.pdf>>, Control Engineering Practice, Elsevier Ltd. Apr. 14, 2003, pp. 1413-1421.

Millán, et al., "Unsupervised defect segmentation of patterned materials under NIR illumination", Retrieved at <<http://iopscience.iop.org/1742-6596/274/1/012044/pdf/1742-6596_274_1_012044.pdf>>, IOP Publishing Ltd, 2011, 9 pages.

Li, et al., "A Near-infrared Image Based Face Recognition System", Retrieved at <<http://www.cbsr.ia.ac.cn/Li%20Group/papers/IR-Face-FG06.pdf>>, In the Proceedings of the 7th International Conference on Automatic Face and Gesture Recognition, 2006, 6 pages.

(56) References Cited

OTHER PUBLICATIONS

Paquit, et al., "Near-infrared imaging and structured light ranging for automatic catheter insertion", Retrieved at <<http://www.cbsr.ia.ac.cn/Li%20Group/papers/IR-Face-FG06.pdf>>, 2006, 9 pages.
Hardin, Winn, "Machine Vision Makes the Leap to Consumer Gaming", Retrieved at <<http://www.machinevisiononline.org/vision-resources-details.cfm?content_id=2398>>, Dec. 8, 2010, 3 pages.
"European Search Report", European Patent Application No. 12195349.1, (Apr. 22, 2013), 3 pages.
"Final Office Action", U.S. Appl. No. 13/309,859, (May 15, 2013), 13 pages.
"Foreign Office Action", European Patent Application No. 12194891.3, (Apr. 24, 2013), 5 pages.
"Non-Final Office Action", U.S. Appl. No. 13/025,180, (Apr. 5, 2013), 17 pages.
"Non-Final Office Action", U.S. Appl. No. 13/441,228, (Mar. 20, 2013), 12 pages.
"Restriction Requirement", U.S. Appl. No. 13/488,046, (May 2, 2013), 5 pages.
"Supplementary European Search Report", European Patent Application No. 12194891.3, (Apr. 4, 2013), 3 pages.
"Final Office Action", U.S. Appl. No. 12/474,453, (May 10, 2012), 14 pages.
"Signal Processing Institute", http://Itswww.epfl.ch/~alahi.student_projects/proposals.shtml#4, Downloaded Feb. 2, 2009, 4 pages.
Walker, et al., "Age Related Differences in Movement Control: Adjusting Submovement Structure to Optimize Performance", *Journals of Gerontology*, (Jan. 1997), pp. 40-52.
Welford, Alan T., "Signal, Noise, Performance, and Age.", *Human Factors*, vol. 23, Issue 1, http://www.ingentaconnect.com/content/hfes/hf/1981/00000023/00000001/art0009, (1981), pp. 97-109.
"Foreign Office Action", Canadian Application No. 2775700, (Aug. 24, 2012), 2 pages.
"Foreign Office Action", Canadian Application No. 2775814, (Aug. 24, 2012), 3 pages.
"Final Office Action", U.S. Appl. No. 12/794,406, (Apr. 22, 2013), 14 pages.
"Final Office Action", U.S. Appl. No. 13/439,284, (Jun. 3, 2013), 27 pages.
"Non-Final Office Action", U.S. Appl. No. 13/488,046, (Jun. 13, 2013), 8 pages.
"Recognizing Visual Focus of Attention from Head Pose in Natural Meetings", *IEEE Transactions on Systems, Man, and Cybernetics, Part B: Cybernetics—Special Issue on Human Computing*, vol. 39, Issue 1, (Feb. 2009), 36 pages.
"Response to Non-Final Office Action", U.S. Appl. No. 12/794,406, (Feb. 14, 2013), 12 pages.
Asteriadis, Stylianos et al., "Estimation of Behavioral User State based on Eye Gaze and Head Pose—Application in an e-Learning Environment", *Journal of Multimedia Tools and Applications*, vol. 41 Issue 3 (Feb. 2009), 25 pages.
Ba, Sileye O., et al., "Head Pose Tracking and Focus of Attention Recognition Algorithms in Meeting Rooms", *Proceedings of the 1st International Evaluation Conference on Classification of Events, Activities and Relationships*, (Apr. 6, 2006), 12 pages.
Boser, Bernhard E., et al., "A Training Algorithm for Optimal Margin Classifiers", *Proceedings of the Fifth Annual Workshop on Computational Learning Theory*, (Jul. 27, 1992), 9 pages.
Bradley, Margaret M., et al., "Measuring Emotion: The Self-Assessment Manikin and the Semantic Differential", In *Journal of Behavior Therapy and Experimental Psychiatry*, vol. 25, Issue 1, (Mar. 1994), 11 pages.
Chang, Chih-Chung et al., "LIBSVM: A Library for Support Vector Machines", retrieved from <http://www.csie.ntu.edu.tw/~cjlin/libsvm/> on Apr. 1, 2013, 4 pages.
El Kaliouby, Rana et al., "Real Time Inference of Complex Mental States from Facial Expressions and Head Gestures", *Proceedings of Conference on Computer Vision and Pattern Recognition Workshop*, (Jun. 27, 2004), 20 pages.

Grace, Richard et al., "A Drowsy Driver Detection System for Heavy Vehicles", *Proceedings of the 17th Digital Avionics Systems Conference, vol. 2*, (Oct. 31, 1998), 8 pages.
Guyon, Isabelle et al., "An Introduction to Variable and Feature Selection", In *Journal of Machine Learning Research, vol. 3*, (Mar. 2003), pp. 1157-1182.
Kapoor, Ashish et al., "Multimodal Affect Recognition in Learning Environments", *Proceedings of the 13th Annual ACM International Conference on Multimedia*, (Nov. 6, 2005), 6 pages.
Liang, Lin et al., "Face Alignment via Component-Based Discriminative Search", *Computer Vision, ECCV 2008, Lecture Notes in Computer Science vol. 5303*, (2008), 14 pages.
McDuff, Daniel "Affective Storytelling: Automatic Measurement of Story Effectiveness from Emotional Responses Collected over the Internet", *PhD Thesis*, retrieved from <http://web.media.mil.edu/~djmcduff/documents/McDuff_Thesis_Proposal.pdf> pdf>>,(Jun. 6, 2012), 16 pages.
McDuff, Daniel et al., "Crowdsourcing Facial Responses to Online Videos", *Proceedings of the IEEE Transactions on Affective Computing*, vol. 3, Issue 4, (Oct. 2012), pp. 456-468.
McDuff, et al., "AffectAura: An Intelligent System for Emotional Memory", In *Proceedings of the SIGCHI Conference on Human Factors in Computing Systems*, Retrieved from <http://www.affectiva.com/assets/Q-Sensor-Microsoft-Publication.pdf>,(May 5, 2012), 10 pages.
Op Den Akker, Rieks et al., "Supporting Engagement and Floor Control in Hybrid Meetings", In *Cross-Modal Analysis of Speech, Gestures, Gaze and Facial Expressions*, (Jul. 2009), 15 pages.
Peacock, James et al., "Which Broadcast Medium Better Drives Engagement? Measuring the Powers of Radio and Television with Electromyography and Skin-Conductance Measurements", In *Journal of Advertising Research*, vol. 51, Issue 4, (Dec. 2011), 8 pages.
Poels, Karolien et al., "How to Capture the Heart? Reviewing 20 Years of Emotion Measurement in Advertising", In *the Journal of Advertising Research*, vol. 46, Issue 1 (Mar. 2006), 48 pages.
Viola, Paul et al., "Robust Real-Time Face Detection", In *International Journal of Computer Vision*, vol. 57, Issue 2, (May 2004), 18 pages.
Voit, Michael et al., "Deducing the Visual Focus of Attention from Head Pose Estimation in Dynamic Multi-View Meeting Scenarios", *Proceedings of the 1oth International Conference on Multimodal Interfaces*, (Oct. 20, 2008), 8 pages.
Wedel, Michel et al., "Eye Fixations on Advertisements and Memory for Brands: A Model and Findings", *Journal of Marketing Science*, vol. 19, Issue 4, (Oct. 2000), pp. 297-312.
Wood, Orlando "Using Faces: Measuring Emotional Engagement for Early Stage Creative", In *ESOMAR, Best Methodology, Annual Congress*, (Sep. 19, 2007), 29 pages.
Zhang, Zhenqiu et al., "Head Pose Estimation in Seminar Room Using Multi View Face Detectors", *Proceedings of the 1st International Evaluation Conference on Classification of Events, Activities and Relationships*, (Mar. 30, 2006), 7 pages.
"Final Office Action", U.S. Appl. No. 13/316,351, (Jul. 31, 2013), 20 pages.
"Foreign Office Action", European Patent Application No. 12195349.1, (May 10, 2013), 5 pages.
"Non-Final Office Action", U.S. Appl. No. 13/363,689, (Jul. 26, 2013), 18 pages.
"PCT Search Report and Written Opinion", Application No. PCT/US2013/035047, (Jul. 5, 2013), 10 pages.
"Final Office Action", U.S. Appl. No. 13/441,228, (Sep. 11, 2013), 15 pages.
"Non-Final Office Action", U.S. Appl. No. 12/972,837, (Jun. 26, 2013), 10 pages.
"Notice of Allowance", U.S. Appl. No. 13/309,859, (Sep. 4, 2013), 7 pages.
"Restriction Requirement", U.S. Appl. No. 13/482,867, (Sep. 6, 2013), 6 pages.
"Restriction Requirement", U.S. Appl. No. 13/114,359, (Sep. 10, 2013), 6 pages.

* cited by examiner

402
Cause one or more laser diodes of a computing device to operate below a lasing threshold to illuminate at least part of a physical surroundings of a computing device

404
Capture one or more images of the illuminated physical surroundings by a camera of the computing device

406
Recognize, from the captured one or more images, one or more inputs for interaction with a user interface displayed by the computing device

408
Cause the one or more laser diodes of the computing device to operate above the lasing threshold

410
Determine a depth of one or more objects in the physical surroundings through at least one image taken by the camera

Fig. 4

LASER DIODE MODES

BACKGROUND

The amount of devices that are made available for a user to interact with a computing device is ever increasing. For example, interaction with a computing device was initially performed using text. Therefore, a user typically entered the text using a keyboard and viewed an output by the computing device that was also in text.

These techniques were then expanded into graphical user interfaces in which a user could interact with a cursor control device, such as a mouse. The techniques continued to expand as graphical user interfaces were configured to recognize gestures made by a user to provide inputs to the computing device. For example, gestures may be used to select objects, interact with a video game, and so on. However, these techniques could face limitations due to the environment in which the techniques were employed, which could limit an ability to recognize inputs. Consequently, these limitations could limit the number and types of inputs that could be supported by a computing device.

SUMMARY

Laser diode mode techniques are described. In one or more implementations, one or more laser diodes of a computing device are caused to operate below a lasing threshold to illuminate at least part of the physical surroundings of the computing device. One or more images of the illuminated physical surroundings are captured by a camera of the computing device and one or more inputs are recognized from the captured one or more images for interaction with a user interface displayed by the computing device.

In one or more implementations, a method implemented by a computing device includes operating one or more laser diodes in a spontaneous mode to illuminate at least part of a physical surroundings of the computing device using incoherent light and operating one or more laser diodes in a coherent mode to project a pattern using coherent light into the physical surroundings that is usable to determine a distance between the one or more laser diodes and one or more objects in the physical surroundings.

In one or more implementations, an apparatus includes a camera, one or more laser diodes, and one or more modules. The one or more modules are configured to operate in a first mode to cause the one or more laser diodes to operate below a lasing threshold to output light to illuminate at least part of a physical surroundings of the camera, and cause the camera to capture one or more images of the illuminated physical surroundings. The one or more modules are also configured to operate in a second mode to cause the one or more laser diodes to operate above a lasing threshold to cause output of coherent light arranged in a pattern and cause the camera to capture at least one image of the pattern of coherent light in the physical surroundings to determine depth of one or more objects in the physical surroundings.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 4 is a flow diagram depicting a procedure in an example implementation in which inputs are recognized from images captured of a physical environment that is illuminated by operating a laser diode below a lasing threshold.

DETAILED DESCRIPTION

Overview

Input techniques that may be utilized to interact with a computing device have evolved from text input techniques typically implemented using a keyboard to gestures that may be captured using a camera. For example, a camera may detect orientation or one or more body parts of a user and recognize a gesture from the detected orientation. This gesture may then be used to interact with a user interface output by the computing device.

However, environments in which the computing device is employed may vary greatly from well-lit environments (e.g., an office) to relatively dark environments, such as those typically employed by users at home when playing a video game. Accordingly, because these environments may vary greatly it may be difficult to configure a camera in a cost effective manner to recognize gestures in each of these environments.

Techniques are described herein, however, that may be used to illuminate the environment to enable the camera to capture images from which the gestures may be recognized. For example, the techniques may leverage one or more laser diodes to operate the diodes below a lasing threshold such that the laser diodes operate as light emitting diodes (LEDs). Additionally, this light may be set so that it is not visible by a human eye (e.g., at near infrared wavelengths), thereby minimizing intrusion of the light in a physical environment. The camera may then capture images that are illuminated using this light, thereby improving an ability to recognize gestures and other objects using the images.

Further, these techniques may leverage laser diodes that may be employed for other purposes by a computing device. For example, the computing device may include laser diodes that are configured to project coherent (e.g., laser) light in a pattern into a physical environment. This pattern may then be used to determine a depth of objects in the physical environment by capturing images of the pattern by the camera or other sensors. In this example, the laser diodes may be configured to support a plurality of modes to operate in a mode for depth sensing by operating above a lasing threshold and operate in a mode for illumination by operating below a lasing threshold. In this way, the laser diodes may be used for multiple purposes, thereby saving cost of the computing device. Further discussion of the laser diode modes may be found in relation to the following sections.

In the following discussion, an example environment is first described that is operable to employ the laser mode techniques described herein. Example illustrations of the techniques and procedures are then described, which may be employed in the example environment as well as in other environments. Accordingly, the example environment is not limited to performing the example techniques and procedures. Likewise, the example techniques and procedures are not limited to implementation in the example environment.

Example Environment

Figure 1:
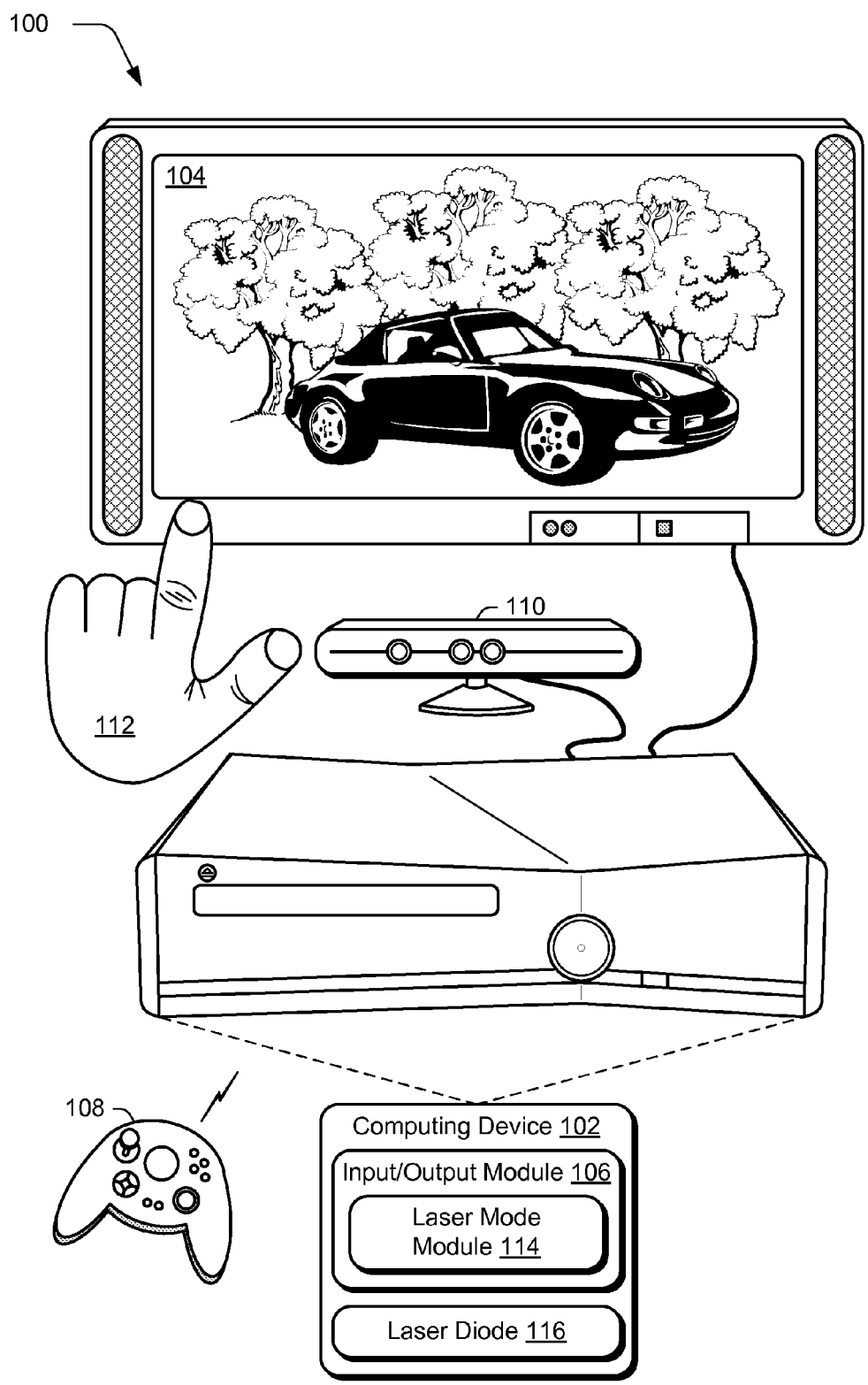
FIG. 1 is an illustration of an environment in an example implementation that is operable to employ laser diode mode techniques described herein.

FIG. 1 is an illustration of an environment 100 in an example implementation that is operable to employ laser mode techniques. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a game console communicatively coupled to a display device 104 (e.g., a television) as illustrated, may be configured as part of a display device (e.g., the television), a wireless phone, a tablet, a netbook, and so forth as further described in relation to FIG. 5. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 may also relate to software that causes the computing device 102 to perform one or more operations.

The computing device 102 is illustrated as including an input/output module 106. The input/output module 106 is representative of functionality relating to recognition of inputs and/or provision of outputs by the computing device 102. For example, the input/output module 106 may be configured to receive inputs from a keyboard, mouse, to identify gestures and cause operations to be performed that correspond to the gestures, and so on. The inputs may be detected by the input/output module 106 in a variety of different ways.

The input/output module 106 may be configured to receive one or more inputs via touch interaction with a hardware device, such as a controller 108 as illustrated. Touch interaction may involve pressing a button, moving a joystick, movement across a track pad, use of a touch screen of the display device 104 (e.g., detection of a finger of a user's hand or a stylus), and so on. Recognition of the touch inputs may be leveraged by the input/output module 106 to interact with a user interface output by the computing device 102, such as to interact with a game, an application, browse the internet, change one or more settings of the computing device 102, and so forth. A variety of other hardware devices are also contemplated that involve touch interaction with the device. Examples of such hardware devices include a cursor control device (e.g., a mouse), a remote control (e.g. a television remote control), a mobile communication device (e.g., a wireless phone configured to control one or more operations of the computing device 102), and other devices that involve touch on the part of a user or object.

The input/output module 106 may also be configured to provide a natural user interface (NUI) that may recognize interactions that may not involve touch. For example, the computing device 102 may include a NUI input device 110. The NUI input device 110 may be configured in a variety of ways to detect inputs without having a user touch a particular device, such as to recognize audio inputs through use of a microphone. For instance, the input/output module 106 may be configured to perform voice recognition to recognize particular utterances (e.g., a spoken command) as well as to recognize a particular user that provided the utterances.

In another example, the NUI input device 110 that may be configured to recognize gestures, presented objects, images, and so on through use of a camera. The camera, for instance, may be configured to include multiple lenses so that different perspectives may be captured and thus determine depth. The different perspectives, for instance, may be used to determine a relative distance from the NUI input device 110 and thus a change in the relative distance. The different perspectives may be leveraged by the computing device 102 as depth perception. The images may also be leveraged by the input/output module 106 to provide a variety of other functionality, such as techniques to identify particular users (e.g., through facial recognition), objects, and so on.

The input-output module 106 may leverage the NUI input device 110 to perform skeletal mapping along with feature extraction of particular points of a human body (e.g., 48 skeletal points) to track one or more users (e.g., four users simultaneously) to perform motion analysis. For instance, the NUI input device 110 may capture images that are analyzed by the input/output module 106 to recognize one or more motions made by a user, including what body part is used to make the motion as well as which user made the motion. An example is illustrated through recognition of positioning and movement of one or more fingers of a user's hand 112 and/or movement of the user's hand 112 as a whole. The motions may be identified as gestures by the input/output module 106 to initiate a corresponding operation.

A variety of different types of gestures may be recognized, such a gestures that are recognized from a single type of input (e.g., a motion gesture) as well as gestures involving multiple types of inputs, e.g., a motion gesture and an object gesture made using an object such as a stylus. Thus, the input/output module 106 may support a variety of different gesture techniques by recognizing and leveraging a division between inputs. It should be noted that by differentiating between inputs in the natural user interface (NUI), the number of gestures that are made possible by each of these inputs alone is also increased. For example, although the movements may be the same, different gestures (or different parameters to analogous commands) may be indicated using different types of inputs. Thus, the input/output module 106 may provide a natural user interface that supports a variety of user interaction's that do not involve touch.

Accordingly, although the following discussion may describe specific examples of inputs, in instances different types of inputs may also be used without departing from the spirit and scope thereof. Further, although in instances in the following discussion the gestures are illustrated as being input using a NUI, the gestures may be input using a variety of different techniques by a variety of different devices, such as to employ touchscreen functionality of a tablet computer.

The computing device 102 is further illustrated as including a laser mode module 114 that is representative of functionality to operate a laser diode 116. For example, the laser diode 116 may be employed by the NUI input device 110 to project a pattern using coherent light. This pattern 110 may then be used by the input/output module 106 to sense depth in a physical environment in which the computing device 102 is present. The depth sensing, for instance, may be used to determine gestures, location of objects in a room, and so on.

The laser mode module 106 may also operate the laser diode 116 for illumination purposes by operating the laser diode 116 below a lasing threshold. This illumination may be used help in the capture of images that may better used by the input/output module 106 to identify gestures, objects, and so on, further discussion of which may be found in relation to FIG. 2.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the laser mode techniques described below are platform-independent, meaning that the techniques may be implemented on a variety of commercial computing platforms having a variety of processors.

For example, the computing device 102 may also include an entity (e.g., software) that causes hardware of the computing device 102 to perform operations, e.g., processors, functional blocks, and so on. For example, the computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Figure 2:
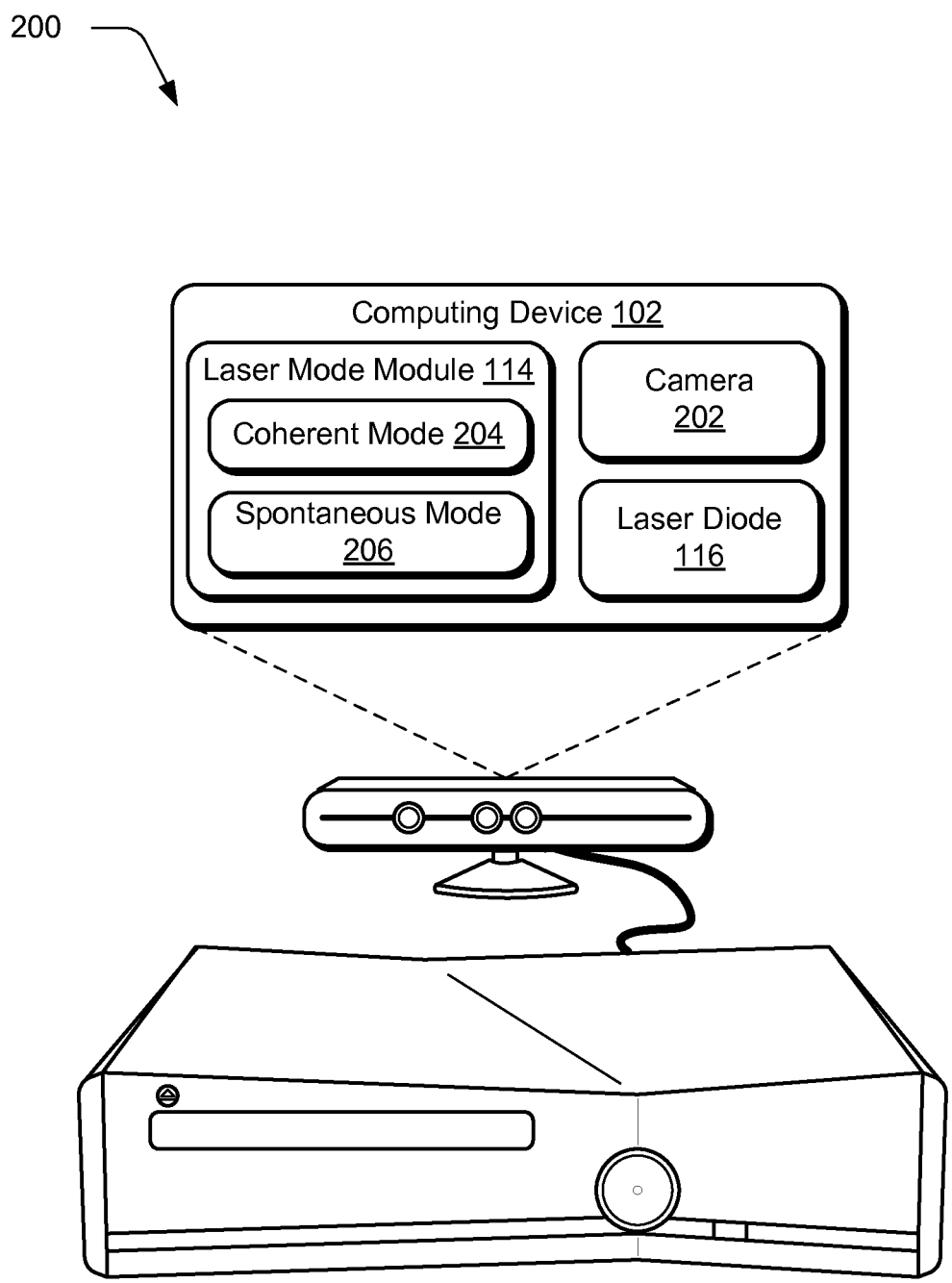
FIG. 2 illustrates an example system showing a laser mode module of FIG. 1 in greater detail as configured to cause a laser diode to operate in a plurality of modes.

FIG. 2 depicts a system 200 in an example implementation in which the laser mode module 114 of FIG. 1 is shown in greater detail. The computing device 102 in this example includes the laser mode module 114 and laser diode 116 as described in relation to FIG. 1 as well as a camera 202.

The laser mode module 114 is illustrated as supporting a coherent mode 204 and a spontaneous mode 206 for control of the laser diode 116. In the coherent mode 204, the laser mode module 114 is configured to operate the laser diode 116 above a lasing threshold. This causes the laser diode 116 to output coherent light. This coherent light may be used for a variety of purposes, such as to project a pattern (e.g., a grid formed from a series of dots) into a physical environment that surrounds the computing device 102. This pattern may be used by the computing device 102 to sense depth of objects that are included in the physical environment, e.g., to determine a distance between the laser diode 116 and the objects.

In the spontaneous mode 206, the laser mode module 114 causes the laser diode 116 to operate below the lasing threshold. This causes the output of incoherent light by the laser diode 116. Thus, in this mode the laser diode 116 acts as a light emitting diode 116 to output light that may be used to illuminate at least part of the physical surroundings of the computing device 102. This light may also be used for a variety of purposes. For example, the spontaneous mode 206 may cause the laser diode 116 to output light that is not visible to a human eye (e.g., near infrared light) into the physical environment. The camera 202 may be configured in this example to capture images at wavelengths that correspond to wavelengths output by the laser diode 116, e.g., the light that is not visible to a human eye. In this way, the physical surroundings of the computing device 102 do not appear to be affected by the illumination output by the laser diode 116 and thus an environment may appear to remain relatively dark yet the camera 202 may still be able to capture images that are suitable to recognize gestures, objects in the physical surroundings, and so on.

Thus, these techniques may leverage a structured light depth camera system that uses coherent (e.g., laser) light to project a known reference pattern into a physical surroundings to also illuminate the surroundings to capture images. For example, the laser mode module 114 may switch between the modes at a frequent basis such that additional laser diodes or supplemental lighting are not employed by the computing device 102. The laser mode module 114 may cause the coherent mode 204 and the spontaneous mode 206 of the laser diode 116 in a variety of ways, such as by varying an operating current supplied to the laser diode 116. A variety of other examples are also contemplated, further discussion of which may be found in relation to the following procedures.

Example Procedures

The following discussion describes laser mode techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
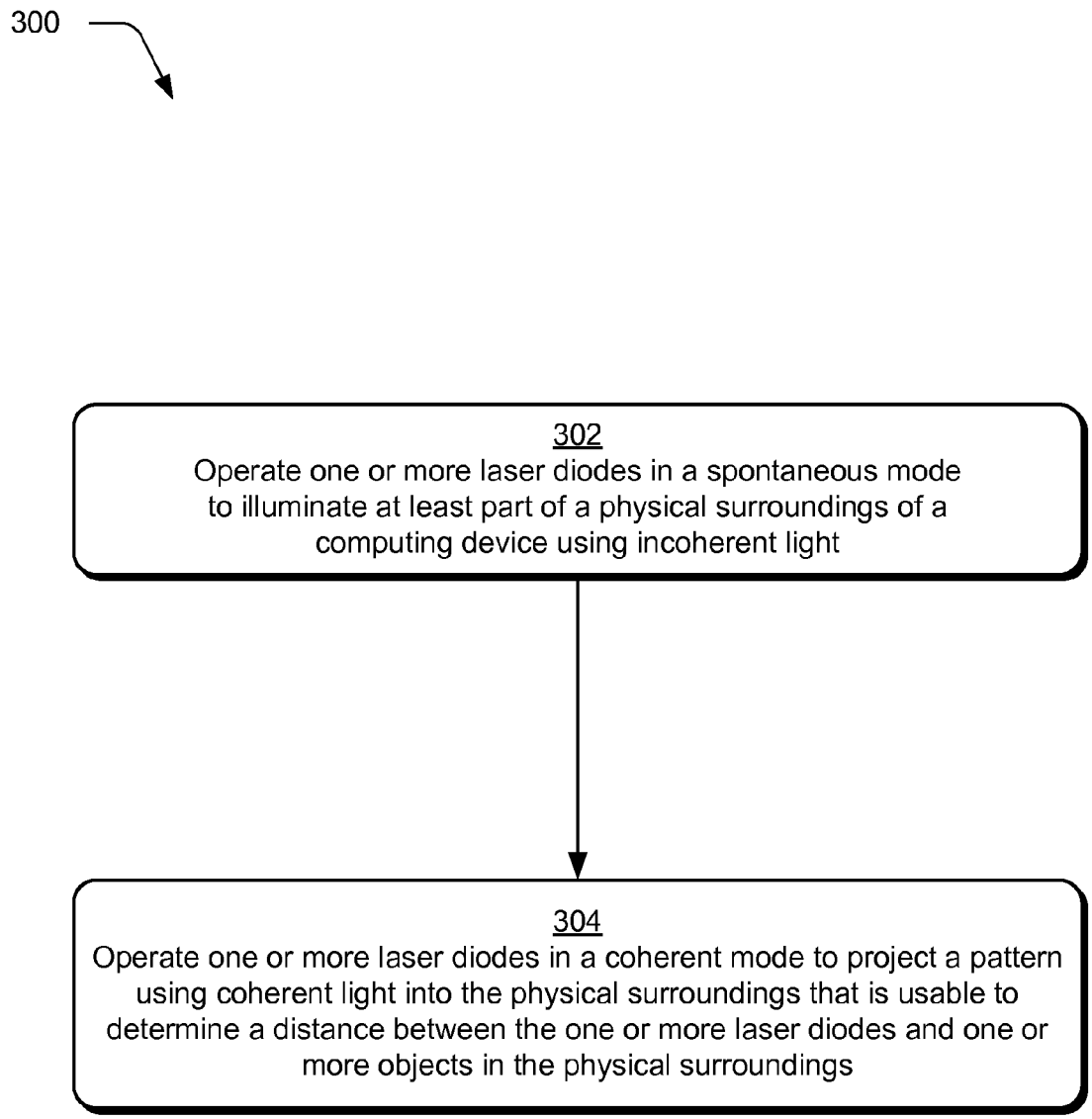
FIG. 3 is a flow diagram depicting a procedure in an example implementation in which laser diodes are operated in different modes to provide illumination or coherent light.

FIG. 3 depicts a procedure 300 in an example implementation in which laser diodes are operated in different modes to provide illumination or coherent light. One or more laser diodes are caused to be operated in a spontaneous mode to illuminate at least part of a physical surroundings of a computing device using incoherent light (block 302). For example, laser mode module 114 may cause an operating current to be provided to the laser diode 116 that causes the laser diode 116 to operate below a lasing threshold. Therefore, the laser diode 116 operates as a light emitting diode (LED). When operating in this mode, the laser diode 116 may output light at a variety of wavelengths, including visible light, light that is not visible to a human eye (e.g., near infrared light), and so on.

One or more laser diodes are also caused to operate in a coherent mode to project a pattern using coherent light into the physical surrounding that is usable to determine a distance between the one or more laser diodes and one or more objects in the physical surroundings (block 304). Continuing with the previous example, the laser mode module 114 may cause an operating current to be provided to the laser diode 116 that is sufficient to cause the laser diode 116 to operate above a lasing threshold. This causes the laser diode 116 to output coherent light, which may be used for a variety of purposes as previously described.

For instance, the coherent light may be used to project a reference pattern that may be used to detect depth of various portions of a physical environment from the computing device 102. The input/output module 106 may examine images taken by the camera 202 of the reference pattern and determine a depth of various parts of the physical environment by distortion of the reference pattern, e.g., spread of various parts of the pattern. In this way, the laser diodes 116 may be used for multiple purposes thereby saving cost in the manufacture and use of the computing device 102. A variety of other examples are also contemplated, further discussion of which may be found in relation to the following figure.

FIG. 4 depicts a procedure 400 in an example implementation in which inputs are recognized from images captured of a physical environment that is illuminated by operating a laser diode below a lasing threshold. One or more laser diodes of a computing device are caused to operate below a lasing threshold to illuminate at least part of a physical surroundings of a computing device (block 402). As before, the laser mode module 114 may cause the laser diode 116 to act as a light emitting diode to illuminate the surrounding, such as through output of near infrared light that is not visible to a human eye.

One or more images of the illuminated physical surroundings are captured by a camera of the computing device (block 404). The camera 202, for instance, may be configured to capture images of wavelengths of radiation that correspond to wavelengths of radiation output by the laser diode 116 when operating in the spontaneous mode 206.

One or more inputs are recognized from the captured one or more images, the input for interaction with a user interface displayed by the computing device (block 406). The input/output mode 106 may process the image to recognize gestures from the images. For example, the gestures may involve orientation of one or more parts of a body of a user, one or more objects, movement of objects, and so on. The recognized gestures may then be used to cause operations to be performed by the computing device 102, such as operations that involve interaction with a user interface output by the computing device 102 for display by a display device.

The one or more laser diodes of the computing device are caused to operate above the lasing threshold (block 408). As before, this operation may cause the laser diode 116 to output coherent light that may be used for a variety of purposes. For instance, a depth may be determined of one or more objects in the physical surroundings through at least one image taken by the camera (block 410). A variety of other examples are also contemplated as previously described.

Example System and Device

Figure 5:
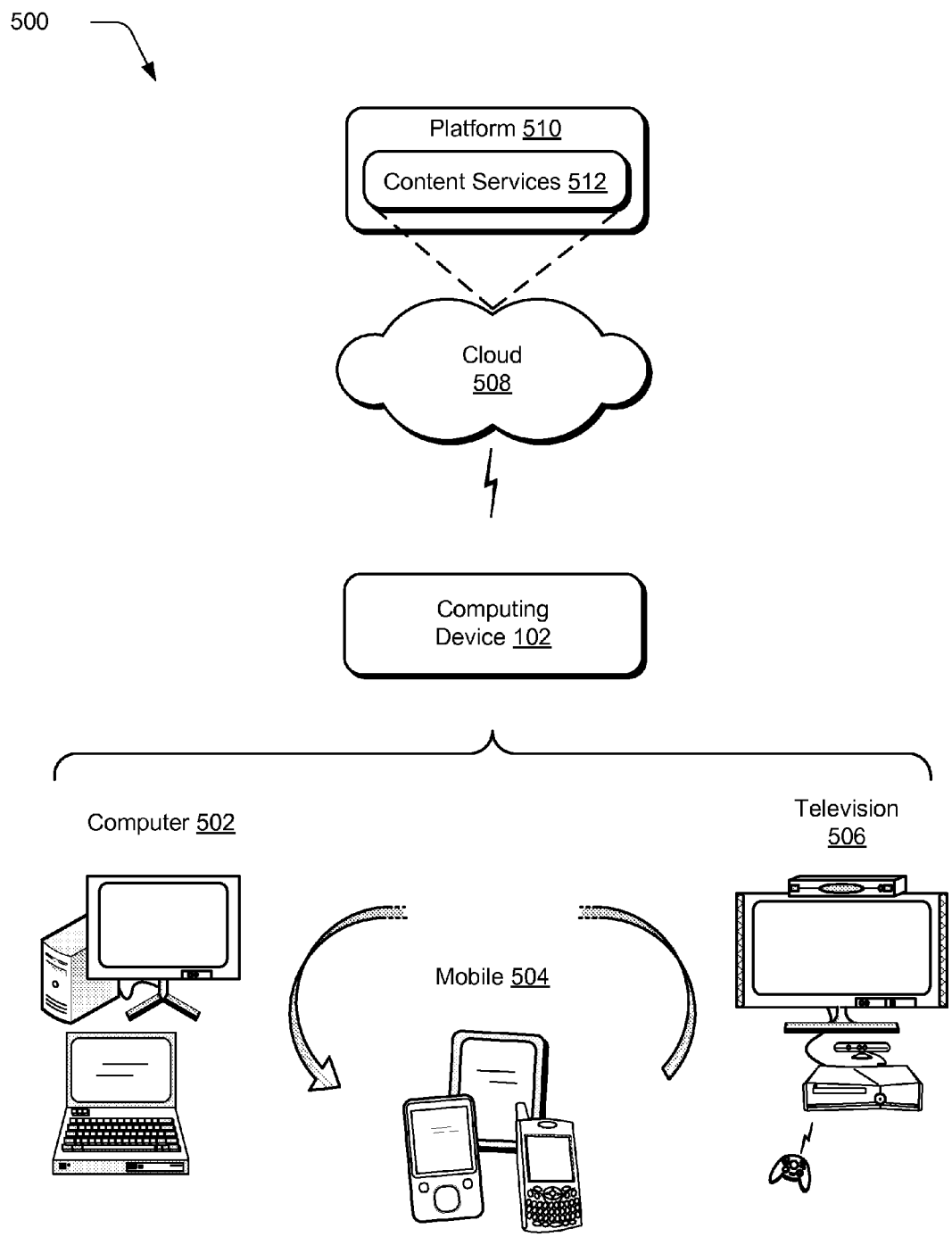
FIG. 5 illustrates an example system that illustrated various configuration of a computing device as described with reference to FIG. 1.

FIG. 5 illustrates an example system 500 that includes the computing device 102 as described with reference to FIG. 1. The example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 102 may assume a variety of different configurations, such as for computer 502, mobile 504, and television 506 uses. Each of these configurations includes devices that may have generally different constructs and capabilities, and thus the computing device 102 may be configured according to one or more of the different device classes. For instance, the computing device 102 may be implemented as the computer 502 class of a device that includes a personal computer, desktop computer, a multi-screen computer, laptop computer, netbook, and so on.

The computing device 102 may also be implemented as the mobile 502 class of device that includes mobile devices, such as a mobile phone, portable music player, portable gaming device, a tablet computer, a multi-screen computer, and so on. The computing device 102 may also be implemented as the television 506 class of device that includes devices having or connected to generally larger screens in casual viewing environments. These devices include televisions, set-top boxes, gaming consoles, and so on. The techniques described herein may be supported by these various configurations of the computing device 102 and are not limited to the specific examples the techniques described herein.

The cloud 508 includes and/or is representative of a platform 510 for content services 512. The platform 510 abstracts underlying functionality of hardware (e.g., servers) and software resources of the cloud 508. The content services 512 may include applications and/or data that can be utilized while computer processing is executed on servers that are remote from the computing device 102. Content services 512 can be provided as a service over the Internet and/or through a subscriber network, such as a cellular or Wi-Fi network.

The platform 510 may abstract resources and functions to connect the computing device 102 with other computing devices. The platform 510 may also serve to abstract scaling of resources to provide a corresponding level of scale to encountered demand for the content services 512 that are implemented via the platform 510. Accordingly, in an interconnected device embodiment, implementation of functionality of the functionality described herein may be distributed throughout the system 500. For example, the functionality may be implemented in part on the computing device 102 as well as via the platform 510 that abstracts the functionality of the cloud 508.

Figure 6:
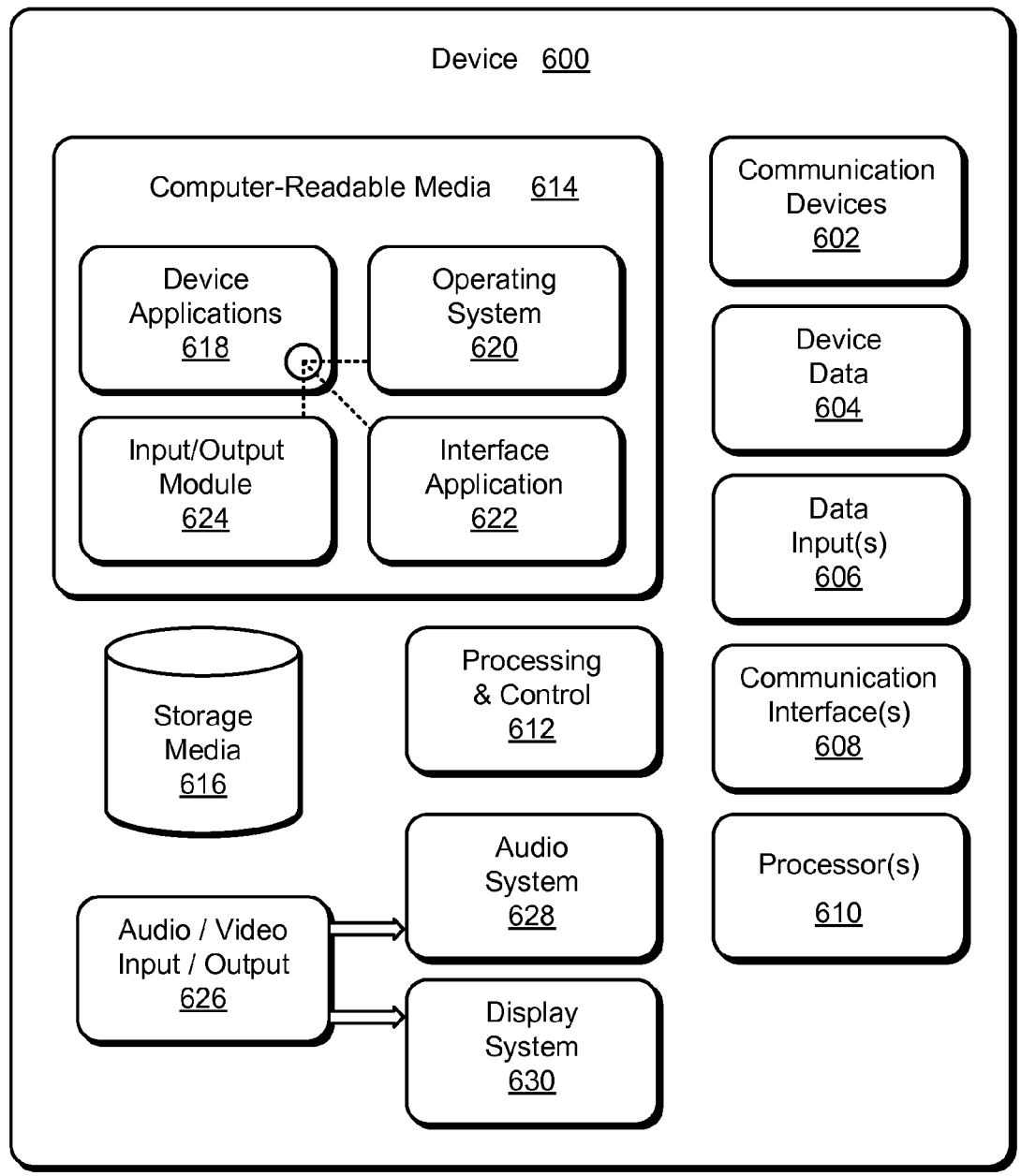
FIG. 6 illustrates various components of an example device that can be implemented as any type of portable and/or computer device as described with reference to FIGS. 1, 2, and 5 to implement embodiments of the laser diode mode techniques described herein.

FIG. 6 illustrates various components of an example device 600 that can be implemented as any type of computing device as described with reference to FIGS. 1, 2, and 5 to implement embodiments of the techniques described herein. Device 600 includes communication devices 602 that enable wired and/or or wireless communication of device data 604 (e.g., received data, data that is being received, data scheduled for broadcast, data packets of the data, etc.). The device data 604 or other device content can include configuration settings of the device, media content stored on the device, and/or information associated with a user of the device. Media content stored on device 600 can include any type of audio, video, and/or image data. Device 600 includes one or more data inputs 606 via which any type of data, media content, and/or inputs can be received, such as user-selectable inputs, messages, music, television media content, recorded video content, and any other type of audio, video, and/or image data received from any content and/or data source.

Device 600 also includes communication interfaces 608 that can be implemented as any one or more of a serial and/or parallel interface, a wireless interface, any type of network interface, a modem, and as any other type of communication interface. The communication interfaces 608 provide a connection and/or communication links between device 600 and a communication network by which other electronic, computing, and communication devices communicate data with device 600.

Device 600 includes one or more processors 610 (e.g., any of microprocessors, controllers, and the like) which process various computer-executable instructions to control the operation of device 600 and to implement embodiments of the techniques described herein. Alternatively or in addition, device 600 can be implemented with any one or combination of hardware, firmware, or fixed logic circuitry that is implemented in connection with processing and control circuits which are generally identified at 612. Although not shown, device 600 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 600 also includes computer-readable media 614, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 600 can also include a mass storage media device 616.

Computer-readable media 614 provides data storage mechanisms to store the device data 604, as well as various device applications 618 and any other types of information and/or data related to operational aspects of device 600. For example, an operating system 620 can be maintained as a computer application with the computer-readable media 614 and executed on processors 610. The device applications 618 can include a device manager (e.g., a control application, software application, signal processing and control module, code that is native to a particular device, a hardware abstraction layer for a particular device, etc.). The device applications 618 also include any system components or modules to implement embodiments of the gesture techniques described herein. In this example, the device applications 618 include an interface application 622 and an input/output module 624 (which may be the same or different as input/output module 114) that are shown as software modules and/or computer applications. The input/output module 624 is representative of software that is used to provide an interface with a device configured to capture inputs, such as a touchscreen, track pad, camera, microphone, and so on. Alternatively or in addition, the interface application 622 and the input/output module 624 can be implemented as hardware, software, firmware, or any combination thereof Additionally, the input/output module 624 may be configured to support multiple input devices, such as separate devices to capture visual and audio inputs, respectively.

Device 600 also includes an audio and/or video input-output system 626 that provides audio data to an audio system 628 and/or provides video data to a display system 630. The audio system 628 and/or the display system 630 can include any devices that process, display, and/or otherwise render audio, video, and image data. Video signals and audio signals can be communicated from device 600 to an audio device and/or to a display device via an RF (radio frequency) link, S-video link, composite video link, component video link, DVI (digital video interface), analog audio connection, or other similar communication link. In an embodiment, the audio system 628 and/or the display system 630 are implemented as external components to device 600. Alternatively, the audio system 628 and/or the display system 630 are implemented as integrated components of example device 600.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
    causing one or more laser diodes of a computing device to operate below a lasing threshold to illuminate at least part of a physical surroundings of the computing device;
    capturing one or more images of the illuminated physical surroundings by a camera of the computing device;
    recognizing, from the captured one or more images, one or more inputs for interaction with a user interface displayed by the computing device; and
    causing the one or more laser diodes of the computing device to operate above the lasing threshold to output coherent light to project a pattern into the physical surroundings.

2. A method as described in claim 1, wherein the causing causes the one or more laser diodes to operate as one or more light-emitting diodes, respectively.

3. A method as described in claim 1, wherein the causing of the one or more laser diodes to operate below the lasing threshold causes the one or more laser diodes to provide illumination that is not visible by a human eye.

4. A method as described in claim 1, wherein the causing of the one or more laser diodes to operate below the lasing threshold causes the one or more laser diodes to provide near infrared illumination.

5. A method as described in claim 1, wherein the capturing of the one or more images of the illuminated physical surroundings is performed for non-depth imaging.

6. A method as described in claim 1, wherein the recognizing of the one or more inputs includes identifying a change made to the physical surroundings of the computing device.

7. A method as described in claim 1, wherein the recognizing of the one or more inputs includes identifying a gesture made using one or more parts of a human body.

8. A method as described in claim 1, wherein the pattern is configured for use to determine depth of one or more objects in the physical surroundings through at least one image taken by the camera.

9. A method implemented by a computing device, the method comprising:
    operating one or more laser diodes in a spontaneous mode to illuminate at least part of a physical surroundings of the computing device using incoherent light in an amount suitable to recognize one or more inputs for interaction with a user interface using a camera of the computing device; and
    operating the one or more laser diodes in a coherent mode to project a pattern using coherent light into the physical surroundings that is usable to determine a distance between the one or more laser diodes and one or more objects in the physical surroundings.

10. A method as described in claim 9, wherein the spontaneous mode causes the one or more laser diodes to operate as a light emitting diode (LED).

11. A method as described in claim 9, wherein the spontaneous mode causes the one or more laser diodes to operate below a lasing threshold and the coherent mode causes the one or more laser diodes to operate above the lasing threshold.

12. A method as described in claim 9, wherein the operating of the one or more laser diodes in the spontaneous mode causes the incoherent light to be output that is not visible by a human eye.

13. An apparatus comprising:
   one or more laser diodes;
   a camera; and
   one or more modules that are configured to operate in:
      a first mode to cause:
         the one or more laser diodes to operate below a lasing threshold to output light to illuminate at least part of a physical surroundings of the camera; and
         the camera to capture one or more images of the illuminated physical surroundings; and
      a second mode in cause:
         the one or more laser diodes to operate above a lasing threshold to cause output of coherent light arranged in a pattern; and
         the camera to capture at least one image of the pattern of coherent light in the physical surroundings to determine depth of one or more objects in the physical surroundings.

14. An apparatus as described in claim 13, wherein the one or more modules are configured to use the captured one or more images of the illuminated physical surroundings in the first mode to recognize one or more inputs as gestures usable to interact with a user interface output by the apparatus for display by a display device.

15. An apparatus as described in claim 13, wherein the one or more laser diodes operate below the lasing threshold in the first mode to output light that is not visible by a human eye.

16. An apparatus as described in claim 13, wherein the first mode is used for non-depth imaging.

17. An apparatus as described in claim 13, wherein the apparatus is formed at least as part of a game console and the one or more modules are configured to cause output of a game via which a user may interact using the first and second modes.

* * * * *